US012577482B1

(12) United States Patent
Alsaiari et al.

(10) Patent No.: US 12,577,482 B1
(45) Date of Patent: Mar. 17, 2026

(54) TRANSESTERIFICATION CATALYST FOR BIODIESEL SYNTHESIS

(71) Applicant: NAJRAN UNIVERSITY, Najran (SA)

(72) Inventors: Raiedhah A. Alsaiari, Najran (SA);
Esraa M. Musa, Najran (SA);
Moustafa A. Rizk, Najran (SA)

(73) Assignee: NAJRAN UNIVERSITY, Najran (SA)

( * ) Notice: Subject to any disclaimer, the term of this patent is extended or adjusted under 35 U.S.C. 154(b) by 0 days.

(21) Appl. No.: 19/270,589

(22) Filed: Jul. 16, 2025

(51) Int. Cl.
| | |
|---|---|
| *C10L 1/02* | (2006.01) |
| *B01J 27/182* | (2006.01) |
| *B01J 35/61* | (2024.01) |
| *B01J 35/63* | (2024.01) |
| *B01J 35/64* | (2024.01) |
| *B01J 37/08* | (2006.01) |

(52) U.S. Cl.
CPC .............. *C10L 1/02* (2013.01); *B01J 27/182* (2013.01); *B01J 35/613* (2024.01); *B01J 35/615* (2024.01); *B01J 35/633* (2024.01); *B01J 35/643* (2024.01); *B01J 35/647* (2024.01); *B01J 37/08* (2013.01); *C10L 2200/0476* (2013.01); *C10L 2200/0484* (2013.01)

(58) Field of Classification Search
CPC .............. C10L 1/02; C10L 2200/0476; C10L 2200/0484; B01J 27/182; B01J 35/613; B01J 35/615; B01J 35/633; B01J 35/643; B01J 35/647; B01J 37/08
See application file for complete search history.

(56) References Cited

U.S. PATENT DOCUMENTS

| | | | | |
|---|---|---|---|---|
| 8,580,119 | B1 * | 11/2013 | Shah | C11B 3/10 |
| | | | | 585/800 |
| 2008/0097114 | A1 * | 4/2008 | Bakshi | C10L 1/026 |
| | | | | 554/174 |
| 2013/0280771 | A1 * | 10/2013 | Chang | C10L 1/026 |
| | | | | 44/388 |
| 2014/0364637 | A1 | 12/2014 | Brandts | |

(Continued)

FOREIGN PATENT DOCUMENTS

| | | |
|---|---|---|
| BR | PI1107273-3 A2 | 11/2015 |
| CN | 109554206 A | 4/2019 |

(Continued)

OTHER PUBLICATIONS

Thawatchai Maneerung, et al., "Sustainable biodiesel production via transesterification of waste cooking oil by using CaO catalysts prepared from chicken manure", Energy Conversion and Management, vol. 123, Sep. 1, 2016, pp. 487-497, 4 pages.

(Continued)

*Primary Examiner* — Ellen M McAvoy
(74) *Attorney, Agent, or Firm* — Oblon, McClelland, Maier & Neustadt, L.L.P.

(57) ABSTRACT

A transesterification catalyst, a method of producing the transesterification catalyst, and a method of producing a biodiesel using the transesterification catalyst. The transesterification catalyst includes crystalline quartz particles, cristobalite particles, and silicon-substituted hydroxycalcioromerite particles by XRD. The transesterification catalyst is formed by a method involving high temperature calcination of camel dung.

20 Claims, 8 Drawing Sheets

(56) References Cited

U.S. PATENT DOCUMENTS

| | | | | |
|---|---|---|---|---|
| 2015/0361365 A1* | 12/2015 | Chen | ...................... | B01J 21/063 |
| | | | | 554/170 |
| 2017/0283723 A1* | 10/2017 | Jimenez Cruz | ......... | C07C 67/02 |
| 2020/0377820 A1* | 12/2020 | Basheer | ................... | B01J 37/20 |
| 2021/0122696 A1* | 4/2021 | Ftouni | .................... | C01F 11/06 |

FOREIGN PATENT DOCUMENTS

| | | |
|---|---|---|
| CN | 115245825 B | 11/2023 |
| CN | 115518638 B | 11/2023 |

OTHER PUBLICATIONS

Mohammad Alherbawi, et al., "Potential of drop-in biofuel production from camel manure by hydrothermal liquefaction and biocrude upgrading: A Qatar case study", Energy, vol. 232, Oct. 1, 2021, 121027, 5 Pages.

* cited by examiner

Thermocouple

Reflux condenser

Magnetic stirrer

Round bottom glass flask

Hot plate

Stirrer speed

TRANSESTERIFICATION CATALYST FOR BIODIESEL SYNTHESIS

STATEMENT OF PRIOR DISCLOSURE BY AN INVENTOR

Aspects of the present disclosure are described in Raiedhah A. Alsaiari, Esraa M. Musa, and Moustafa A. Rizk; "Biodiesel Synthesis from Date Seed Oil Using Camel Dung as a Novel Green Catalyst: An Experimental Investigation"; Catalysis, 2024, 14, 9, 643, which is incorporated herein by reference in its entirety.

STATEMENT OF ACKNOWLEDGEMENT

Support from the Deanship of Graduate Studies and Scientific Research at Najran University under the Easy Funding Program grant code (NU/EFP/SERC/13/14-1) is gratefully acknowledged.

BACKGROUND

Technical Field

The present disclosure is directed to a method of forming biodiesel using a transesterification catalyst including crystalline quartz, cristobalite, and silicon-substituted hydroxycalcioromerite particles.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly nor impliedly admitted as prior art against the present invention.

The growing demand for energy and the environmental challenges posed by fossil fuels have intensified the search for sustainable alternatives. Biodiesel is a promising solution due to its renewable, non-toxic, biodegradable, and carbon-neutral properties. Unlike petroleum diesel, biodiesel contains no sulfur, resulting in cleaner combustion and significantly lower carbon dioxide emissions, which helps reduce air pollution and combat global warming. Consequently, the use of biodiesel contributes to the mitigation of global warming and the preservation of fossil fuel reserves [Raiedhah A. Alsaiari et al., BIOFUELS, 2023, 14, 7, 743-750]. However, biodiesel production can still result in habitat destruction and resource depletion.

The majority of conventional biodiesels are made using edible vegetable oil. Multiple methods exist to produce biodiesel, including esterification, interesterification, and transesterification. Esterification is a commonly used method to produce biodiesel using oil feedstock with high acid values. Interesterification has the potential to generate biodiesel alongside several other valuable by-products, rather than glycerol. In recent years, various studies have examined non-edible and cost-effective alternatives to animal lipids, waste cooking oil (WCO), yellow or brown grease, and sewage oil as fats, oils, and grease (FOG) for biodiesel production [Santos, Jose Luis et al., Applied Catalysis B: Environmental, 2020, 268, 118-423]. The nature of the catalyst employed during the transesterification reaction is crucial in converting triglycerides to biodiesel. Biodiesel is typically produced through the transesterification of vegetable oils or animal fats with low molecular weight alcohols, such as methanol or ethanol, in the presence of a homogeneous alkaline catalyst, such as an alkoxide ion [Raiedhah A. et al., Open Chemistry 2023, 21, 2023-0135]. As a result, different catalysts have been explored for converting triglycerides to biodiesel fuel.

A transesterification catalyst facilitates the conversion of triglycerides and alcohol (methanol or ethanol) into biodiesel and glycerol. Effective catalysts, whether basic or acidic, enhance the reaction rate and increase biodiesel yield. The catalysts used to manufacture biodiesel were classified into three distinct categories: homogeneous, heterogeneous, and enzyme-based. Typically, homogeneous catalysts, such as sodium hydroxide (NaOH) and potassium hydroxide (KOH), are employed. Heterogeneous catalysts were manufactured from various waste materials, including shells, ash from biomass combustion, biochar, bones from slaughtered animals, and activated carbon. Heterogeneous catalysts offer many advantages over homogeneous catalysts, such as simple catalyst recovery, catalyst reusability, less energy and water consumption, less added cost of purification, and simple glycerol recovery.

Camel dung tend to be more alkaline because the digestive systems of herbivores, which designed to break down plant material, which is often more alkaline in nature. Camel dungs are a readily available and abundant resource in regions where camels are prevalent in Empty Quarter desert in Saudi Arabia. This makes them a sustainable source for catalyst material, reducing the need for traditional chemical catalysts that may be less eco-friendly. Furthermore, utilizing camel dung as a catalyst repurposes a waste material that would otherwise need to be managed or disposed of. This contributes to waste reduction and minimizes environmental impact.

Accordingly, one object of the present disclosure is a method for producing biodiesel using a heterogenous catalyst that addresses the limitations of current technologies.

SUMMARY

According to a first aspect, the present disclosure relates to a transesterification catalyst. In some embodiments, the transesterification catalyst includes quartz particles, cristobalite particles, and particles of a silicon-substituted hydroxycalcioromerite. In some embodiments, the quartz particles, cristobalite particles, and silicon-substituted hydroxycalcioromerite particles are crystalline by powder X-ray diffraction (PXRD).

In some embodiments, the catalyst includes sodium present in an amount of 1.5 to 4.0 wt. %, magnesium present in an amount of 5.0 to 10.0 wt. %, silicon present in an amount of 12.5 to 20 wt. %, phosphorous present in an amount of 2.5 to 10 wt. %, calcium present in an amount of 17.5 to 27.5 wt. %, and oxygen present in an amount of 37.5 to 50.0 wt. %, each based on a total weight of catalyst.

In some embodiments, the transesterification catalyst has a basicity of 6.5 to 9.0 mmol HCl/g.

In some embodiments, the transesterification catalyst has a BET surface area of 50 to 250 $m^2$/g, a mean pore size of 1.50 to 2.50 nm, and a pore volume of 0.075 to 0.250 $cm^3$/g.

In some embodiments, the quartz particles, cristobalite particles, and silicon-substituted hydroxycalcioromerite particles each have a mean particle size of 0.1 to 3.0 μm.

The present disclosure also relates to a method of forming the transesterification catalyst. In some embodiments, the method includes calcining dried camel dung at 600 to 1000° C. for 1 to 8 hours.

In some embodiments, the camel dung is dung of *Camelus dromedarius.*

In some embodiments, the method of calcining the camel dung is performed with a heating rate of 5 to 20° C./min.

The present disclosure also relates to a method of forming biodiesel. In some embodiments, the method includes reacting an alcohol having 1 to 5 carbon atoms with a plant-derived oil in the presence of the catalyst of to form a biodiesel including a fatty acid ester and collecting the biodiesel by separation.

In some embodiments, the catalyst is present in an amount of 0.25 to 10 wt. % based on a total weight of alcohol and plant-derived oil.

In some embodiments, the alcohol and plant-derived oil are present in a mole ratio of 1:1 to 1:15.

In some embodiments, the method of reacting the alcohol is performed at 50 to 100° C.

In some embodiments, the plant-derived oil is date seed oil.

In some embodiments, the alcohol having 1 to 5 carbon atoms is ethanol.

In some embodiments, the method has a biodiesel yield of 70 to 95%.

In some embodiments, the biodiesel has an acid number of 0.25 to 0.75 mg KOH/g, a density of 865 to 910 kg/m³, a viscosity at 40° C. of 3.5 to 5.5 mm²/s, and a flash point of 120 to 150° C.

In some embodiments, the method of reacting the alcohol is performed for 0.5 to 6 hours.

In some embodiments, the biodiesel includes dodecanoic acid methyl ester, and oleic acid methyl ester.

In some embodiments, the dodecanoic acid methyl ester is present in an amount of 12.5 to 22.5 wt. %, and the oleic acid methyl ester is present in an amount of 20 to 30 wt. %, each based on a total weight of biodiesel.

In some embodiments, the biodiesel further comprises dodecanoic acid ethyl ester, tetradecanoic acid methyl ester, oleic acid ethyl ester, and n-hexadecanoic acid methyl ester.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

4

Figure 4A:
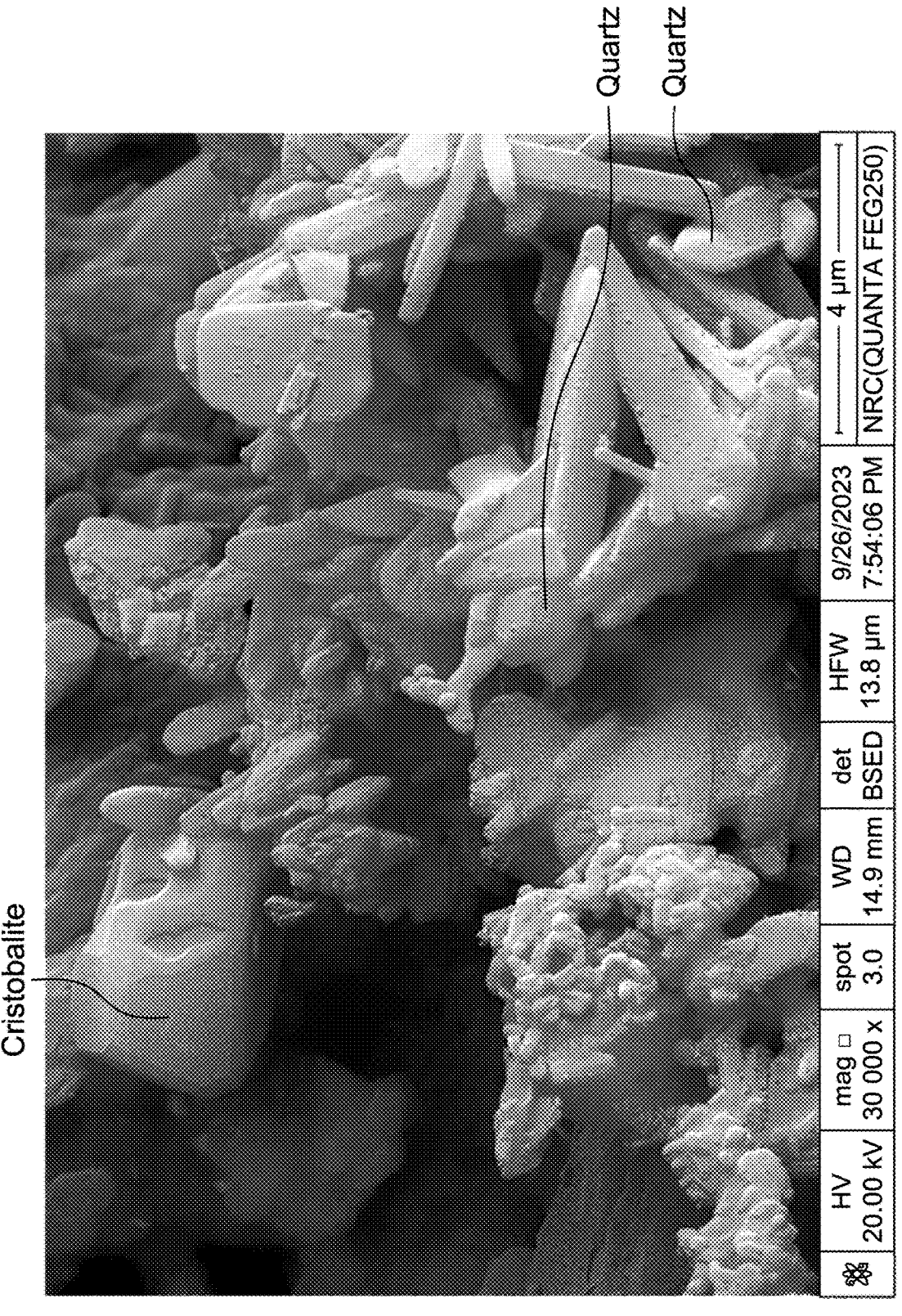
FIG. 4A is a scanning electron microscope (SEM) micrographs of camel dung sample treated at 800° C., according to certain embodiments.
Figure 4B:
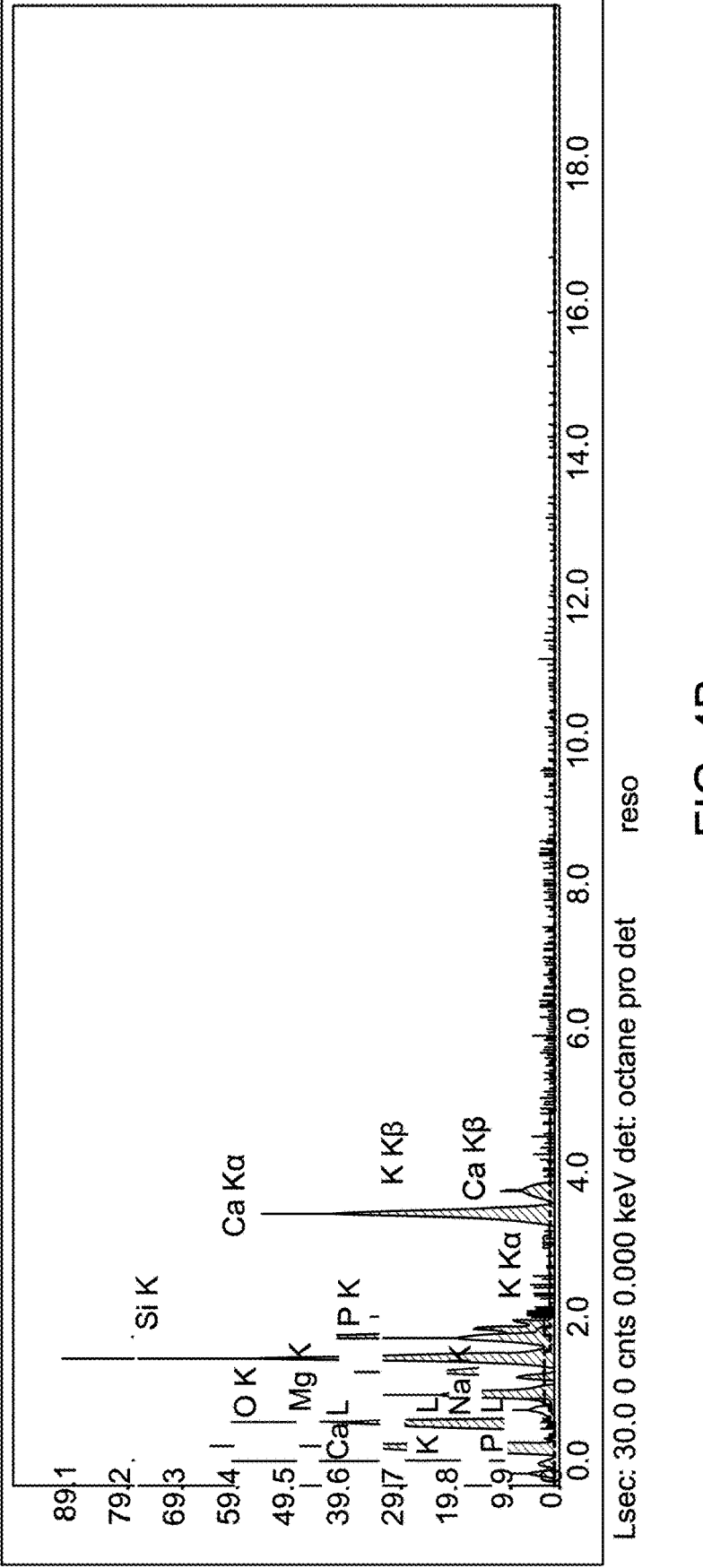

FIG. 4B shows an energy-dispersive X-ray (EDX) spectrum for camel dung sample treated at 800° C., according to certain embodiments.

Figure 5:
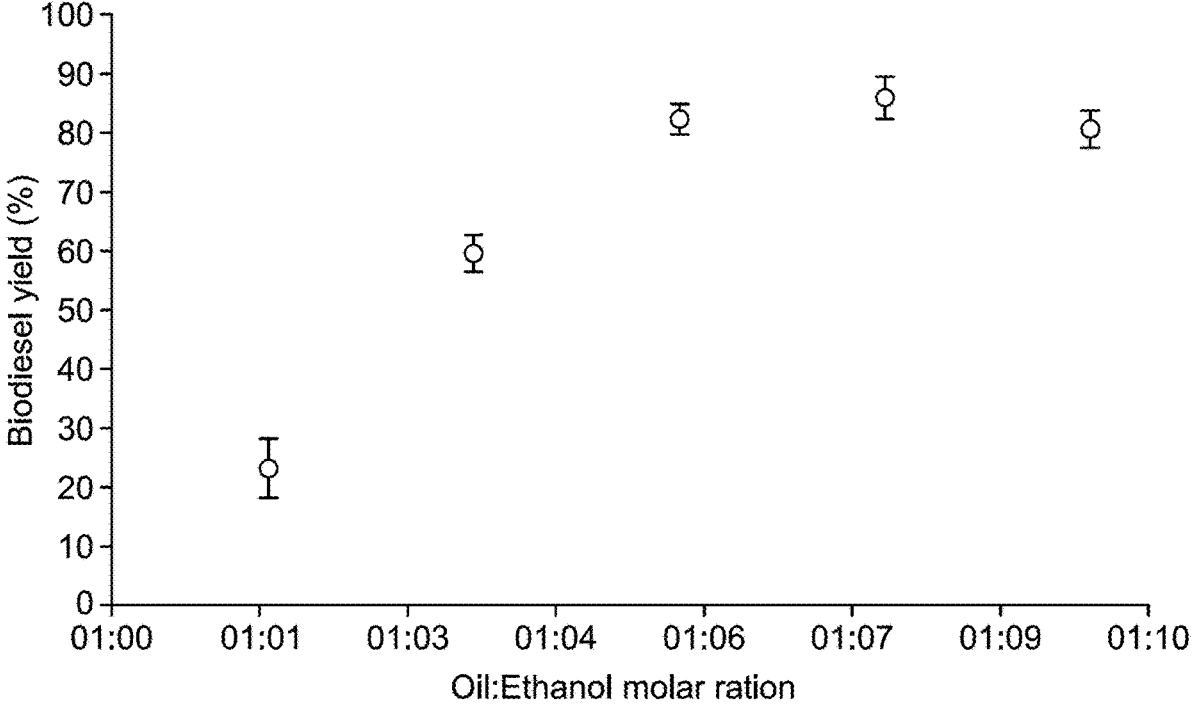

FIG. 5 is a graph showing the effect of the ethanol-to-date seed oil molar ratio on biodiesel yield (%), with reaction conditions of 4 wt. % catalyst loading, 3-hour reaction time, and a reaction temperature of 75° C., according to certain embodiments.

Figure 6:
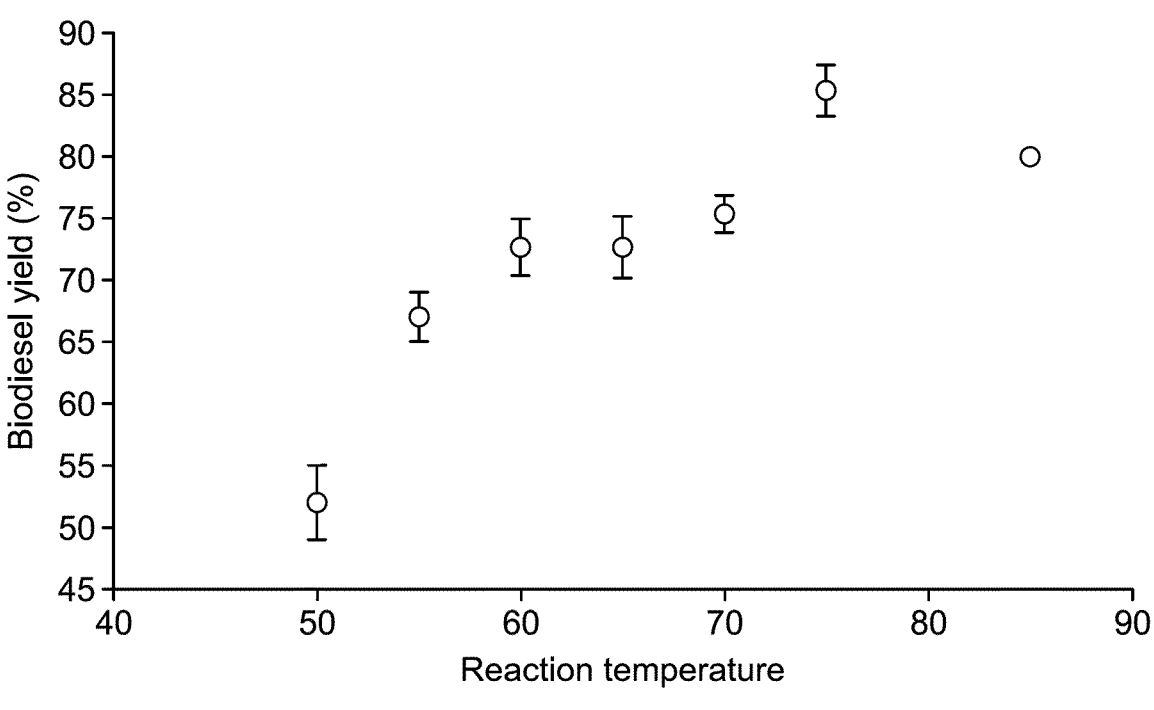

FIG. 6 is a graph showing the effect of reaction temperature on biodiesel yield (%), under reaction conditions of 4 wt. % catalyst loading, an ethanol-to-date seed oil molar ratio of 8:1, and a reaction time of 3 hours, according to certain embodiments.

Figure 7:
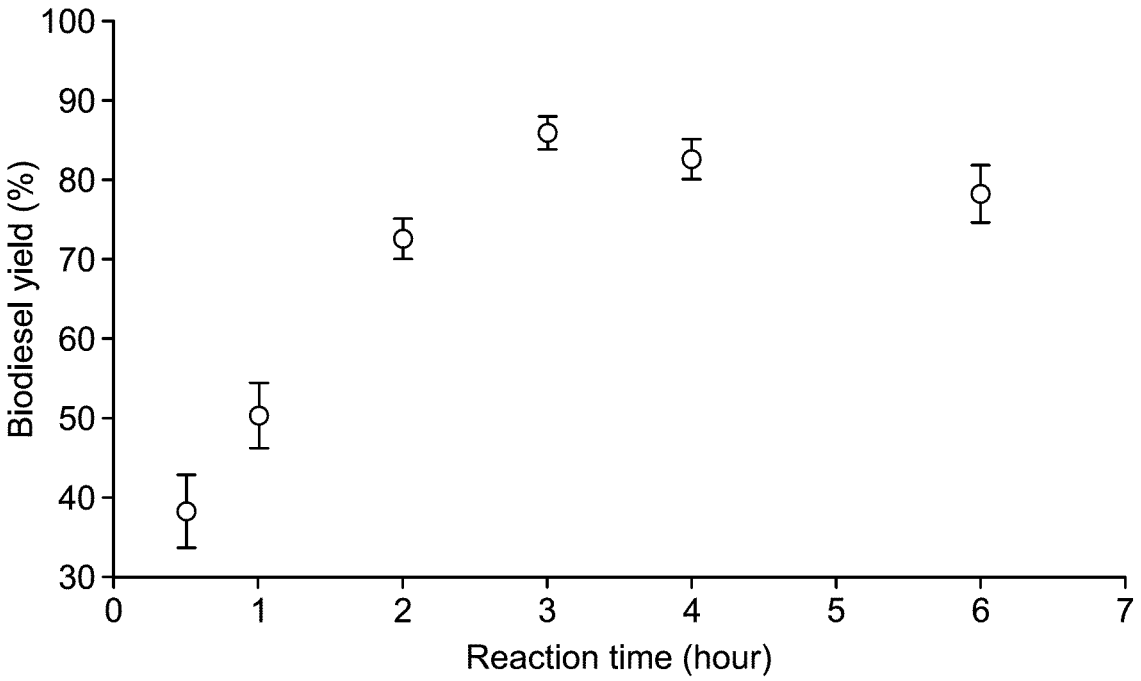

FIG. 7 is a graph showing an effect of reaction time on biodiesel yield (%), under reaction condition with 4 wt. % catalyst loading, an ethanol-to-date seed oil molar ratio of 8:1, and a reaction temperature of 75° C., according to certain embodiments.

Figure 8:
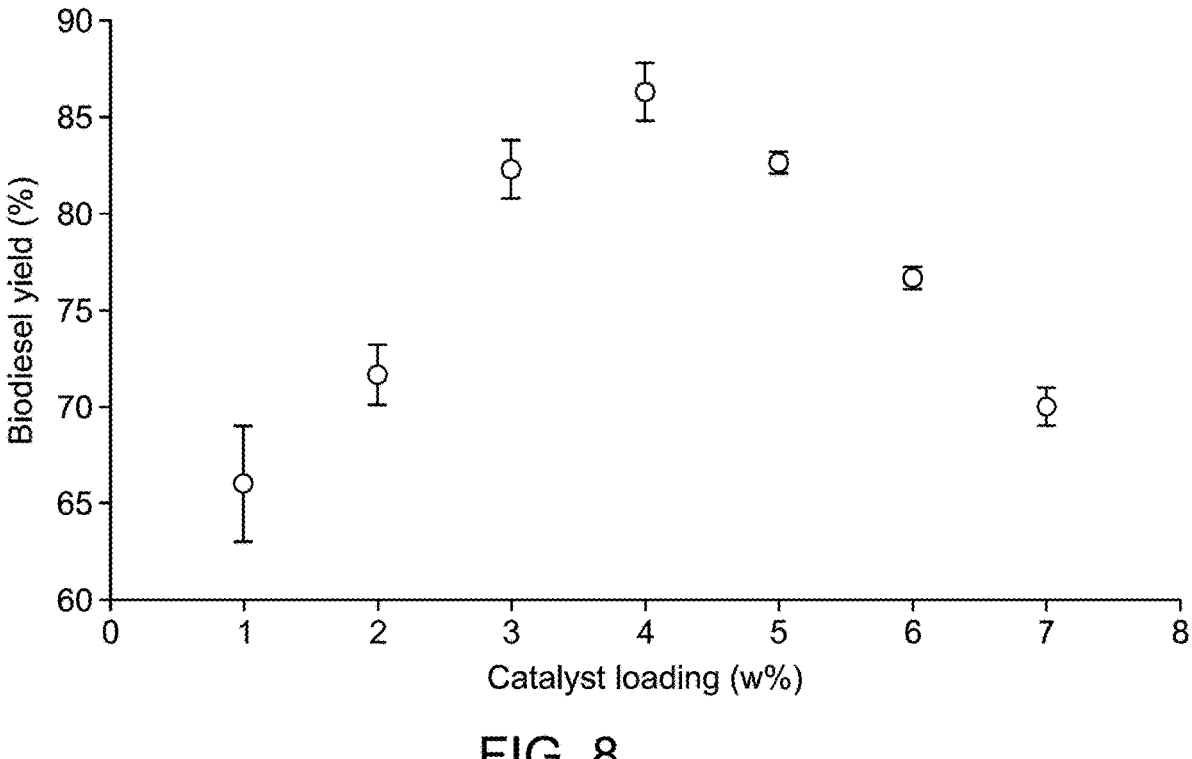

FIG. 8 is a graph showing an effect of catalyst loading on biodiesel yield (%), under reaction conditions of an 8:1 ethanol-to-date seed oil molar ratio, 3-hour reaction time, and a reaction temperature of 75° C., according to certain embodiments.

DETAILED DESCRIPTION

In the drawings, like reference numerals designate identical or corresponding parts throughout the several views. Further, as used herein, the words "a," "an" and the like generally carry a meaning of "one or more," unless stated otherwise.

Furthermore, the terms "approximately," "approximate," "about," and similar terms generally refer to ranges that include the identified value within a margin of 20%, 10%, or preferably 5%, and any values therebetween.

As used herein, the term "transesterification catalyst" refers to a substance that facilitates the transesterification reaction, which involves the conversion of triglycerides or other esters into biodiesel and glycerol. These catalysts can be either acidic or basic and are essential for increasing the reaction rate and yield of biodiesel production. Common examples include sodium hydroxide, potassium hydroxide, sulfuric acid, and other alkaline or acid-based catalysts that promote the reaction between fats or oils and alcohols.

As used herein, the term "camel dung" refers to the excrement produced by camels, specifically from the species *Camelus dromedarius* and *Camelus bactrianus.* This organic material is commonly used as a fertilizer, fuel, and in traditional building materials. Camel dung is rich in nutrients and can improve soil quality when applied as manure. Additionally, it is utilized in various cultural practices and has applications in biogas production due to its anaerobic decomposition potential.

As used herein, the term "*Camelus dromedarius*" refers to the scientific name for the dromedary camel, a large domesticated species characterized by its single hump. This species is well-adapted to arid environments and is primarily found in North Africa, the Middle East, and parts of South Asia. Dromedary camels are important for their use as pack animals, sources of milk and meat, and their role in cultural and economic practices in desert regions. They are known for their endurance and ability to thrive in harsh conditions with limited water and food.

As used herein, the term "viscosity" refers to a measure of a fluid's resistance to flow. It quantifies the internal friction within the fluid, indicating how thick or thin it is. Viscosity is influenced by temperature and pressure, with higher temperatures generally reducing viscosity in liquids. It is an important property in various applications, including the formulation of fuels, lubricants, and other industrial fluids, as it affects how these substances behave under different conditions. Viscosity is typically measured in units such as centipoise (cP) or pascal-seconds (Pa·s).

As used herein, the term "biodiesel" refers to a renewable, biodegradable fuel made from organic materials, primarily vegetable oils, animal fats, or recycled cooking oils. It is produced through a process called transesterification, where triglycerides react with an alcohol (usually methanol or ethanol) in the presence of a catalyst to form fatty acid esters, such as fatty acid methyl esters (FAME), and glycerol. Biodiesel can be used as a substitute for or blended with petroleum diesel in diesel engines, offering a cleaner-burning alternative that can reduce greenhouse gas emissions and dependence on fossil fuels.

As used herein, the term "acid number" refers to a measurement of the amount of acidic substances present in a sample, typically expressed in milligrams of potassium hydroxide (KOH) required to neutralize the acids in one gram of the sample. It is an important parameter in assessing the quality and stability of oils, fats, and biodiesel, indicating the level of free fatty acids and potential degradation products. A higher acid number suggests a greater presence of acidity, which can affect the performance and suitability of the material for various applications.

Transesterification Catalyst

According to a first aspect, the present disclosure relates to a transesterification catalyst. In some embodiments, the transesterification catalyst is derived from camel dung. In some embodiments, the transesterification is used in a method of synthesizing biodiesel. In some embodiments, the biodiesel is synthesize from date seed oil. Utilizing camel dung as a catalyst or catalyst precursor may be advantageous for achieving a high reaction rate, efficiency, and/or yield of biodiesel. This may also be advantageous for reducing an amount of organic waste or biowaste associated with camel cultivation and/or biodiesel production.

In some embodiments, transesterification catalyst includes quartz particles, cristobalite particles, and particles of a silicon-substituted hydroxycalcioromerite. In some embodiments, the transesterification catalyst may also include an additional material which is at least one selected from the group consisting of a zeolite, alumina, magnesium oxide, calcium carbonate, calcium oxide, sodium carbonate, potassium carbonate, titanium dioxide, zirconium oxide, barium oxide, cerium oxide, iron oxide, lanthanum oxide, silica gel, activated carbon, biochar, lignin, cellulose, chitosan, montmorillonite, kaolinite, titanium silicate, iron phosphates, nickel oxide, cobalt oxide, strontium oxide, molybdenum oxide, copper oxide, vanadium oxide, magnesium silicate, and graphene oxide.

In some embodiments, the quartz particles, cristobalite particles, and silicon-substituted hydroxycalcioromerite particles are crystalline by X-Ray diffraction (XRD). In some embodiments, the additional material is crystalline by XRD. In some embodiments, the additional material is not crystalline by XRD. In some embodiments, the transesterification catalyst comprises three crystalline phases by XRD. In some embodiments, the three crystalline phases are quartz, cristobalite, and a silicon-substituted hydroxycalcioromerite (also known as "Lewisite"). It should be understood that the mineral or inorganic material "Lewisite" refers to the hydroxycalcioromerite or a silicon-substituted version thereof. Ther term "Lewisite" does not refer to the organoarsenic compound of the same name. In some embodiments, the transesterification catalyst consists of three crystalline phases by XRD. That is, no other crystalline phases besides the quartz, cristobalite, and a silicon-substituted hydroxycalcioromerite are detected by XRD.

In some embodiments, the transesterification catalyst includes sodium. In some embodiments, the sodium may be present in an amount ranging from 1.5 to 4.0 wt. % %., based on the total weight of catalyst. For example, sodium may be present in an amount of 1.75 wt. %, 1.80 wt. %, 1.85 wt. %, 1.90 wt. %, 1.95 wt. %, 2.00 wt. %, 2.05 wt. %, 2.10 wt. %, 2.15 wt. %, 2.20 wt. %, 2.25 wt. %, 2.30 wt. %, 2.35 wt. %, 2.40 wt. %, 2.50 wt. %, 2.55 wt. %, 2.60 wt. %, 2.65 wt. %, 2.70 wt. %, 2.75 wt. %, 2.80 wt. %, 2.85 wt. %, 2.90 wt. %, 2.95 wt. %, 3.00 wt. %, 3.05 wt. %, 3.10 wt. %, 3.15 w. %, 3.20 wt. %, 3.25 wt. %, 3.30 wt. %, 3.35 wt. %, 3.40 wt. %, 3.45 wt. %, 3.50 wt. %, 3.55 wt. %, 3.60 wt. %, 3.65 wt. %, 3.70 wt. %, 3.75 wt. %, 3.80 wt. %, 3.85 wt. %, 3.90 wt. %, or 3.95 wt. %, based on the total weight of catalyst. In some embodiments, the transesterification catalyst includes sodium present in an amount of 2.21 wt. %, based on the total weight of catalyst.

In some embodiments, the transesterification catalyst includes magnesium. In some embodiments, the magnesium may be present in an amount ranging from 5.0 to 10.0 wt. %, based on the total weight of catalyst. For example, magnesium may be present in an amount of 5.25 wt. %, 5.50 wt. %, 5.75 wt. %, 6.00 wt. %, 6.25 wt. %, 6.50 wt. %, 6.75 wt. %, 7.00 wt. %, 7.25 wt. %, 7.50 wt. %, 7.75 wt. %, 8.00 wt. %, 8.25 wt. %, 8.50 wt. %, 8.75 wt. %, 9.00 wt. %, 9.25 wt. %, 9.50 wt. %, or 9.75 wt. %, based on the total weight of catalyst. In some embodiments, the transesterification catalyst includes magnesium present in an amount of 7.55 wt. %, based on the total weight of catalyst.

In some embodiments, the transesterification catalyst includes silicon. In some embodiments, the silicon may be present in an amount ranging from 12.5 to 20 wt. %, based on the total weight of catalyst. For example, silicon may be present in an amount of 12.75 wt. %, 13.00 wt. %, 13.25 wt. %, 13.50 wt. %, 13.75 wt. %, 14.00 wt. %, 14.25 wt. %, 14.50 wt. %, 14.75 wt. %, 15.00 wt. %, 15.25 wt. %, 15.50 wt. %, 15.75 wt. %, 16.00 wt. %, 16.25 wt. %, 16.50 wt. %, 16.75 wt. %, 17.00 wt. %, 17.25 wt. %, 17.50 wt. %, 17.75 wt. % 18.00 wt. %, 18.25 wt. %, 18.50 wt. %, 18.75 wt. %, 19.00 wt. %, 19.25 wt. %, 19.50 wt. %, or 19.75 wt. %, based on the total weight of catalyst. In some embodiments, the transesterification catalyst includes silicon present in an amount of 16.37 wt. %, based on the total weight of catalyst.

In some embodiments, the transesterification catalyst includes phosphorous. In some embodiments, the phosphorus may be present in an amount ranging from 2.5 to 10 wt. %, based on the total weight of catalyst. For example, the phosphorus may be present in an amount of 2.75 wt. %, 3.00 wt. %, 3.25 wt. %, 3.50 wt. %, 3.75 wt. %, 4.00 wt. %, 4.25 wt. %, 4.50 wt. %, 4.75 wt. %, 5.00 wt. %, 5.25 wt. %, 5.50 wt. %, 5.75 wt. %, 6.00 wt. %, 6.25 wt. %, 6.50 wt. %, 6.75 wt. %, 7.00 wt. %, 7.25 wt. %, 7.50 wt. %, 7.75 wt. %, 8.00 wt. %, 8.25 wt. %, 8.50 wt. %, 8.75 wt. %, 9.00 wt. %, 9.25 wt. %, 9.50 wt. %, or 9.75 wt. %, based on a total weight of the catalyst. In some embodiments, the transesterification catalyst includes phosphorous present in an amount of 6.82 wt. %, based on the total weight of catalyst.

In some embodiments, the transesterification catalyst includes calcium. In some embodiments, the calcium may be present in an amount ranging from 17.5 to 27.5 wt. %, based on the total weight of catalyst. For example, the calcium may be present in an amount of 17.75 wt. %, 18.00 wt. %, 18.25 wt. %, 18.50 wt. %, 18.75 wt. %, 19.00 wt. %, 19.25 wt. %, 19.50 wt. %, 19.75 wt. %, 20.00 wt. %, 20.25 wt. %, 20.50 wt. %, 20.75 wt. %, 21.00 wt. %, 21.25 wt. %, 21.50 wt. %, 21.75 wt. %, 22.00 wt. %, 22.25 wt. %, 22.50 wt. %, 22.75 wt. %, 23.00 wt. %, 23.25 wt. %, 23.50 wt. %, 23.75 wt. %, 24.00 wt. %, 24.25 wt. %, 24.50 wt. %, 24.75 wt. %, 25.00 wt. %, 25.25 wt. %, 25.50 wt. %, 25.75 wt. %, 26.00 wt. %, 26.25 wt. %, 26.50 wt. %, 26.75 wt. %, 27.00 wt. %, or 27.25 wt. %, based on a total weight of the catalyst. In some embodiments, the transesterification catalyst includes calcium present in an amount of 23.7 wt. %, based on the total weight of catalyst.

In some embodiments, the transesterification catalyst includes oxygen. In some embodiments, the oxygen may be present in an amount ranging from 37.5 to 50.0 wt. %, based on the total weight of catalyst. For example, the oxygen may be present in an amount of 38.0 wt. %, 38.5 wt. %, 39.0 wt. %, 39.5 wt. %, 40.0 wt. %, 40.5 wt. %, 41.0 wt. %, 41.5 wt. %, 42.0 wt. %, 42.5 wt. %, 43.0 wt. %, 43.5 wt. %, 44.0 wt. %, 44.5 wt. %, 45.0 wt. %, 45.5 wt. %, 46.0 wt. %, 46.5 wt. %, 47.0 wt. %, 47.5 wt. %, 48.0 wt. %, 48.5 wt. %, 49.0 wt. %, or 49.5 wt. %, based on a total weight of catalyst. In some embodiments, the transesterification catalyst includes oxygen present in an amount of 42.05 wt. %, based on the total weight of catalyst.

In some embodiments, the transesterification catalyst may have a basicity ranging from 6.5 to 9.0 mmol HCl/g. For example, the transesterification catalyst may have a basicity of 6.75 mmol HCl/g, 7.00 mmol HCl/g, 7.25 mmol HCl/g, 7.50 mmol HCl/g, 7.75 mmol HCl/g, 8.00 mmol HCl/g, 8.25 mmol HCl/g, 8.50 mmol HCl/g, 8.75 mmol HCl/g, or 9.0 mmol HCl/g. In some embodiments, the transesterification catalyst has a basicity which is dependent upon a temperature used in the calcination during the preparation of the transesterification catalyst. For example, a catalyst prepared at a temperature of 600° C. can have a basicity of 7.0 mmol HCl/g, a catalyst prepared at a temperature of 800° C. can have a basicity of 8.3 mmol HCl/g, and/or a catalyst prepared at a temperature of 1000° C. can have a basicity of 7.8 mmol/HCl.

In some embodiments, the transesterification catalyst may have a BET surface area ranging from 50 to 250 m²/g. For example, the transesterification catalyst can have a BET surface area of 55 m²/g, 60 m²/g, 65 m²/g, 70 m²/g, 75 m²/g, 80 m²/g, 85 m²/g, 90 m²/g, 95 m²/g, 100 m²/g, 105 m²/g, 110 m²/g, 115 m²/g, 120 m²/g, 125 m²/g, 130 m²/g, 140 m²/g, 145 m²/g, 150 m²/g, 155 m²/g, 160 m²/g, 165 m²/g, 170 m²/g, 175 m²/g, 180 m²/g, 185 m²/g, 190 m²/g, 195 m²/g, 200 m²/g, 205 m²/g, 210 m²/g, 215 m²/g, 220 m²/g, 225 m²/g, 230 m²/g, 235 m²/g, 240 m²/g, 245 m²/g, or 250 m²/g. In some embodiments, the transesterification catalyst has a BET surface area which is dependent upon a temperature used in the calcination during the preparation of the transesterification catalyst. For example, a catalyst prepared at a temperature of 600° C. can have a BET surface area of 56.31 and/or a catalyst prepared at a temperature of 800° C. can have a BET surface area of 177.69 m²/g.

In some embodiments, the transesterification catalyst may have a mean pore size ranging from 1.50 to 2.50 nm. For example, the transesterification catalyst may have a mean pore size of 1.55 nm, 1.60 nm, 1.65 nm, 1.70 nm, 1.75 nm, 1.80 nm, 1.85 nm, 1.90 nm, 1.95 nm, 2.00 nm, 2.05 nm, 2.10 nm, 2.15 nm, 2.20 nm, 2.25 nm, 2.30 nm, 2.35 nm, 2.40 nm, 2.45 nm, or 2.50 nm. In some embodiments, the transesterification catalyst may have a mean pore size which is dependent upon a temperature used in the calcination during the preparation of the transesterification catalyst. For example, a catalyst prepared at a temperature of 600° C. can have a mean pore size of 1.98 and/or a catalyst prepared at a temperature of 800° C. can have a mean pore size of 1.89 nm.

In some embodiments, the transesterification catalyst may have a pore volume ranging from 0.075 to 0.250 cm³/g. For example, the transesterification catalyst may have a pore volume of 0.080 cm³/g, 0.090 cm³/g, 0.095 cm³/g, 0.100 cm³/g, 0.105 cm³/g, 0.110 cm³/g, 0.115 cm³/g, 0.120 cm³/g, 0.125 cm³/g, 0.130 cm³/g, 0.135 cm³/g, 0.140 cm³/g, 0.145 cm³/g, 0.150 cm³/g, 0.155 cm³/g, 0.160 cm³/g, 0.165 cm³/g, 0.170 cm³/g, 0.175 cm³/g, 0.180 cm³/g, 0.185 cm³/g, 0.190 cm³/g, 0.195 cm³/g, 0.200 cm³/g, 0.205 cm³/g, 0.210 cm³/g, 0.215 cm³/g, 0.220 cm³/g, 0.225 cm³/g, 0.230 cm³/g, 0.235 cm³/g, 0.240 cm³/g, or 0.245 cm³/g. In some embodiments, the transesterification catalyst may have a pore volume which is dependent upon a temperature used in the calcination during the preparation of the transesterification catalyst. For example, a catalyst prepared at a temperature of 600° C. can have a pore volume of 0.089 and/or a catalyst prepared at a temperature of 800° C. can have a pore volume of 0.16 cm³/g.

In some embodiments, the transesterification catalyst is in the form of particles. In some embodiments, the transesterification catalyst particles comprise the quartz, cristobalite, and silicon-substituted hydroxycalcioromerite. In some embodiments, the transesterification particles comprise the other materials described above. That is, the transesterification catalyst particles are composite particles comprising multiple crystalline materials. In some embodiments, the transesterification catalyst particles include separate quartz particles, cristobalite particles, and silicon-substituted hydroxycalcioromerite particles. In general, the following description can apply to a transesterification catalyst that includes separate particles and to a transesterification catalyst that includes composite particles.

In general, the transesterification catalyst particles can be any shape known to one of ordinary skill in the art. Examples of suitable shapes the transesterification catalyst particles may take include spheres, spheroids, lentoids, ovoids, solid polyhedra such as tetrahedra, cubes, octahedra, icosahedra, dodecahedra, hollow polyhedra, stellated polyhedra (both regular and irregular), triangular prisms, hollow spherical shells, tubes, sheets, platelets, discs, rods, and mixtures thereof. In the case of rods, the rod shape may be defined by a ratio of a rod length to a rod width, the ratio being known as the aspect ratio. For transesterification catalyst particles of the current invention, rods should have an aspect ratio less than 1000, preferably less than 750, preferably less than 500, preferably less than 250, preferably less than 100, preferably less than 75, preferably less than 50, preferably less than 25.

In some embodiments, the transesterification catalyst particles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of transesterification catalyst particles having a different shape. As used herein, the term "non-uniform shape" refers to an average consistent shape that differs by more than 10% of the distribution of transesterification catalyst particles having a different shape. In one embodiment, the shape is uniform and at least 90% of the transesterification catalyst particles are spherical or substantially circular, and less than 10% are polygonal. In another embodiment, the shape is non-uniform and less than 90% of the transesterification catalyst particles are spherical or substantially circular, and greater than 10% are polygonal.

In some embodiments, the transesterification catalyst particles have a mean particle size of 0.1 to 3.0 μm. For example, the transesterification catalyst particles can have a mean particle size of 0.25 μm, 0.5 μm, 0.75 μm, 1.0 μm, 1.25 μm, 1.5 μm, 1.75 μm, 2.0 μm, 2.25 μm, 2.5 μm, 2.75 μm, 3.0 μm. In embodiments where the transesterification catalyst particles are spherical, the particle size may refer to a particle diameter. In embodiments where the transesterification catalyst particles are polyhedral or some other non-spherical shape, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass. In some embodiments where the transesterification catalyst particles have an anisotropic shape such as rods, the particle size may refer to a length of the rod, a width of the rod, or an average of the length and width of the rod. In some embodiments in which the transesterification catalyst particles have non-spherical shapes, the particle size refers to the diameter of a sphere having an equivalent volume as the particle. In some embodiments in which the transesterification catalyst particles have non-spherical shapes, the particle size refers to the diameter of a sphere having an equivalent diffusion coefficient as the particle.

In some embodiments, the transesterification catalyst particles of the present disclosure are monodisperse, having a coefficient of variation or relative standard deviation, expressed as a percentage and defined as the ratio of the particle size standard deviation (σ) to the particle size mean (μ) multiplied by 100 of less than 25%, preferably less than 10%, preferably less than 8%, preferably less than 6%, preferably less than 5%, preferably less than 4%, preferably less than 3%, preferably less than 2%. In some embodiments, the transesterification catalyst particles of the present disclosure are monodisperse having a particle size distribution ranging from 80% of the average particle size to 120% of the average particle size, preferably 90-110%, preferably 95-105% of the average particle size. In some embodiments, the transesterification catalyst particles are not monodisperse.

In general, the particle size may be determined by any suitable method known to one of ordinary skill in the art. In some embodiments, the particle size is determined by powder X-ray diffraction (PXRD). Using PXRD, the particle size may be determined using the Scherrer equation, which relates the full-width at half-maximum (FWHM) of diffraction peaks to the size of regions comprised of a single crystalline domain (known as crystallites) in the sample. In some embodiments, the crystallite size is the same as the particle size. For accurate particle size measurement by PXRD, the particles should be crystalline, comprise only a single crystal, and lack non-crystalline portions. Typically, the crystallite size underestimates particle size compared to other measures due to factors such as amorphous regions of particles, the inclusion of non-crystalline material on the surface of particles such as bulky surface ligands, and particles which may be composed of multiple crystalline domains. In some embodiments, the particle size is determined by dynamic light scattering (DLS). DLS is a technique which uses the time-dependent fluctuations in light scattered by particles in suspension or solution in a solvent, typically water to measure a size distribution of the particles. Due to the details of the DLS setup, the technique measures a hydrodynamic diameter of the particles, which is the diameter of a sphere with an equivalent diffusion coefficient as the particles. The hydrodynamic diameter may include factors not accounted for by other methods such as non-crystalline material on the surface of particles such as bulky surface ligands, amorphous regions of particles, and surface ligand-solvent interactions. Further, the hydrodynamic diameter may not accurately account for non-spherical particle shapes. DLS does have an advantage of being able to account for or more accurately model solution or suspension behavior of the particles compared to other techniques. In some embodiments, the particle size is determined by electron microscopy techniques such as scanning electron microscopy (SEM) or transmission electron microscopy (TEM).

Method of Forming Transesterification Catalyst

The present disclosure also relates to a method of forming the transesterification catalyst. In some embodiments, the method includes calcining camel dung. In some embodiments, the camel dung is calcined at a temperature of 600 to 1000° C. For example, the dried camel dung may be calcined at 625° C., 650° C., 675° C., 700° C., 725° C., 750° C., 775° C., 800° C., 825° C., 850° C., 875° C., 900° C., 925° C., 950° C., or 975° C. In some embodiments, the calcining is performed for 1 to 8 hours. For example, the calcining can be performed for 1.25 hours, 1.5 hours, 1.75 hours, 2 hours, 2.25 hours, 2.5 hours, 2.75 hours, 3 hours, 3.25 hours, 3.5 hours, 3.75 hours, 4 hours, 4.25 hours, 4.5 hours, 4.75 hours, 5 hours, 5.25 hours, 5.5 hours, 5.75 hours, 6 hours, 6.25 hours, 6.5 hours, 6.75 hours, 7 hours, 7.25 hours, 7.5 hours, or 7.75 hours.

In some embodiments, the calcining is performed with a heating rate ranging from 5 to 20° C./min. For example, the calcining can be performed with a heating rate of 6° C./min, 7° C./min, 8° C./min, 9° C./min, 10° C./min, 11° C./min, 12° C./min, 13° C./min, 14° C./min, 15° C./min, 16° C./min, 17° C./min, 18° C./min, or 19° C./min. In some embodiments, the calcining is performed with a heating rate ranging of 10° C./min.

In some embodiments, prior to the calcining, the camel dung is dried. In general, the camel dung can be dried using any suitable technique. Examples of drying techniques include, but are not limited to solar drying, air drying, oven drying, heat pump drying, vacuum drying, freeze drying, convective drying, supercritical drying, spray drying, and the like. The drying can be performed with added heat. That is, the drying can take place at a temperature above ambient temperature. When the drying takes place at a temperature above ambient temperature, the drying temperature is preferably less than the temperature used in the calcination described above.

In some embodiments, prior to the calcining, the camel dung is ground, milled, or otherwise reduced to smaller particles. In general, the grinding or milling may be performed by any suitable technique or with any suitable equipment known to one of ordinary skill in the art. Examples of such techniques include, but are not limited to, grinding, ball milling, chopping, pulverizing, crushing, pounding, mincing, shredding, smashing, and fragmenting. In some embodiments, the milling may take place using a mill, ball mill, rod mill, autogenous mill, cutting mill, semi-autogenous grinding mill, pebble mill, buhrstone mill, burr mill, tower mill, vertical shaft impactor mill, a low energy milling machine, grinder, pulverizer, mortar and pestle, blender, crusher, or other implement used to reduce a material to small particles. In some embodiments, the milling is high-energy ball milling. In some embodiments, the camel dung is ground, milled, or otherwise reduced to smaller particles following the drying.

In some embodiments, the camel dung may be of any suitable camel species. Examples of camel species include, but are not limited to, *Camelus bactrianus, Camelus ferus, Camelus sar, Camelus gigas, Camelus hercules, Camelus murrayensis, Camelus pallasii, Camelus* sar *camelus, Camelus bactrianus* f. *fuscus, Camelus ferus* f. *ferus, Camelus ferus* f. *domesticus, Camelus ruminatus, Camelus camelopardalis, Camelus senegalensis, Camelus fruticosus, Camelus antilocapra, Camelus ocellatus, Camelus crassus, Camelus agilis, Camelus sussurus, Camelus langsonensis, Camelus alticamelus, Camelus humpedus, Camelus tentaculatus, Camelus levis, Camelus depressus, Camelus gracilis, Camelus maculatus, Camelus borealis,* and *Camelus indicus.* In some embodiments, the camel dung is dung of *Camelus dromedarius.*

Method of Forming Biodiesel

The present disclosure also relates to a method of forming biodiesel. In some embodiments, the method includes reacting an alcohol having 1 to 5 carbon atoms with a plant-derived oil in the presence of the catalyst to form the biodiesel comprising a fatty acid ester.

In general, the alcohol having 1 to 5 carbon atoms may be any suitable alcohol having 1 to 5 carbon atoms. Examples of alcohols having 1 to 5 carbon atoms include, but are not limited to, methanol, ethanol, n-propanol, isopropanol, n-butanol, 2-butanol, isobutanol, tert-butanol, n-pentanol, 2-pentanol, 3-pentanol, 2-methyl-1-butanol, 3-methyl-1-butanol (isopentanol, isoamyl alcohol), 2-methyl-2-butanol (tert-amyl alcohol), 2-methyl-3-butanol, 2,2-dimethylpropanol, cyclopropanol, cyclobutanol, cyclopentanol, ethylene glycol, 1,3-propanediol, 1,2-propanediol, propane-2,2-diol, 1,4-butanediol, 1,3-butanediol, and 1,2-butanediol. In some embodiments, the alcohol having 1 to 5 carbon atoms has one or two hydroxyl groups (i.e., is a mono-alcohol or a diol). In some embodiments, the alcohol having 1 to 5 carbon atoms has one hydroxyl group. In some embodiments, the alcohol having 1 to 5 carbon atoms is ethanol.

In some embodiments, the plant-derived oil may be any suitable oil derived from a plant. Examples of plant-derived oils include, but are not limited to, date seed oil, olive oil, coconut oil, sunflower oil, canola oil, soybean oil, corn oil, peanut oil, sesame oil, avocado oil, grapeseed oil, flaxseed oil, hemp oil, palm oil, almond oil, walnut oil, hazelnut oil, chia seed oil, pumpkin seed oil, safflower oil, castor oil, argan oil, tea tree oil, jojoba oil, rosehip oil, macadamia oil, cacao butter, shea butter, borage oil, evening primrose oil, and black cumin seed oil. In some embodiments, the plant-derived oil is date seed oil.

In some embodiments, the catalyst is present in an amount ranging from 0.25 to 10 wt. %, based on the total weight of alcohol and plant-derived oil. For example, the catalyst may be present in an amount of 0.5 wt. %, 0.75 wt. %, 1.0 wt. %, 1.25 wt. %, 1.5 wt. %, 1.75 wt. %, 2.0 wt. %, 2.25 wt. %, 2.5 wt. %, 2.75 wt. %, 3.0 wt. %, 3.25 wt. %, 3.5 wt. %, 3.75 wt. %, 4.0 wt. %, 4.25 wt. %, 4.5 wt. %, 4.75 wt. %, 5.0 wt. %, 5.25 wt. %, 5.5 wt. %, 5.75 wt. %, 6.0 wt. %, 6.25 wt. %, 6.5 wt. %, 6.75 wt. %, 7.0 wt. %, 7.25 wt. %, 7.5 wt. %, 7.75 wt. %, 8.0 wt. %, 8.25 wt. %, 8.5 wt. %, 8.75 wt. %, 9.0 wt. %, 9.25 wt. %, 9.5 wt. %, 9.75 wt. %, or 10 wt. %, based on the total weight of alcohol and plant-derived oil. In some embodiments, the catalyst is present in an amount of 4 wt. %, based on the total weight of alcohol and plant-derived oil.

In some embodiments, the alcohol and plant-derived oil are present in a molar ratio ranging from 1:1 to 1:15. For example, the alcohol and plant-derived oil can be present in a molar ratio of 1:1, 1:1.5, 1:2, 1:2.5, 1:3, 1:3.5, 1:4, 1:4.5, 1:5, 1:5.5, 1:6, 1:6.25, 1:6.5, 1:6.75, 1:7, 1:7.25, 1:7.5, 1:7.75, 1:8, 1:8.25, 1:8.5, 1:8.75, 1:9, 1:9.25, 1:9.5, 1:9.75, 1:10, 1:10.5, 1:11, 1:11.5, 1:12, 1:12.5, 1:13, 1:13.5, 1:14, 1:14.5, or 1:15. In some embodiments, the alcohol and plant-derived oil are present in a molar ratio of 1:8.

In some embodiments, the reacting is performed at a temperature ranging from 50 to 100° C. For example, the reacting can be performed at a temperature of 52.5° C., 55° C., 57.5° C., 60° C., 62.5° C., 65° C., 67.5° C., 70° C., 72.5° C., 75° C., 77.5° C., 80° C., 82.5° C., 85° C., 87.5° C., 90° C., 92.5° C., 95° C., 97.5° C., or 100° C. In some embodiments, the reacting is performed at a temperature of at about 75° C.

In some embodiments, reacting is performed for a time period ranging from 0.5 to 6 hours. For example, the reacting can be performed for 0.75 hours, 1.0 hours, 1.25 hours, 1.5 hours, 1.75 hours, 2.0 hours, 2.25 hours, 2.5 hours, 2.75 hours, 3.0 hours, 3.25 hours, 3.5 hours, 3.75 hours, 4.0 hours, 4.25 hours, 4.5 hours, 4.75 hours, 5.0 hours, 5.25 hours, 5.5 hours, 5.75 hours, or 6 hours. In some embodiments, reacting is performed for time period of 3 hours.

In some embodiments, the reaction results in the formation of the biodiesel. In some embodiments, the biodiesel is separated from the reactants and/or other products of the reacting. In general, the biodiesel may be separated by any separation technique known in the art. In some embodiments, the method has a biodiesel yield ranging from 70 to 95%. In some embodiments, the yield is based on an amount of plant-derived oil used in the reacting. For example, the method can have a biodiesel yield of 72.5%, 75%, 77.5%, 80%, 82.5%, 85%, 87.5%, 90%, 92.5%, or 95%. In some embodiments, the method has a biodiesel yield that is dependent upon a temperature used in the calcination during the preparation of the transesterification catalyst. For example, a method using a catalyst prepared at a temperature of 800° C. can have a biodiesel yield of 86% and/or a method using a catalyst prepared at a temperature of 100° C. can have a biodiesel yield of 80%.

In some embodiments, the biodiesel has an acid number ranging from 0.25 to 0.75 mg KOH/g. For example, the biodiesel can have an acid number of 25 mg KOH/g, 0.275 mg KOH/g, 0.30 mg KOH/g, 0.325 mg KOH/g, 0.35 mg KOH/g, 0.375 mg KOH/g, 0.40 mg KOH/g, 0.425 mg KOH/g, 0.45 mg KOH/g, 0.475 mg KOH/g, 0.50 mg KOH/g, 0.525 mg KOH/g, 0.55 mg KOH/g, 0.575 mg KOH/g, 0.60 mg KOH/g, 0.625 mg KOH/g, 0.65 mg KOH/g, 0.675 mg KOH/g, 0.70 mg KOH/g, 0.725 mg KOH/g, or 0.75 mg KOH/g. In some embodiments, the biodiesel has an acid number of 0.5 mg KOH/g.

In some embodiments, the biodiesel has a density ranging from 865 to 910 kg/m³. For example, the biodiesel can have a density of 865 kg/m³, 870 kg/m³, 875 kg/m³, 880 kg/m³, 885 kg/m³, 890 kg/m³, 895 kg/m³, 900 kg/m³, 905 kg/m³, or 910 kg/m³. In some embodiments, the biodiesel has a density of 887 kg/m³.

In some embodiments, the biodiesel has a viscosity at 40° C. ranging from 3.5 to 5.5 mm²/s. For example, the biodiesel may have a viscosity at 40° C. of 3.5 mm²/s, 3.6 mm²/s, 3.7 mm²/s, 3.8 mm²/s, 3.9 mm²/s, 4.0 mm²/s, 4.1 mm²/s, 4.2 mm²/s, 4.3 mm²/s, 4.4 mm²/s, 4.5 mm²/s, 4.6 mm²/s, 4.7 mm²/s, 4.8 mm²/s, 4.9 mm²/s, 5.0 mm²/s, 5.1 mm²/s, 5.2 mm²/s, 5.3 mm²/s, 5.4 mm²/s, or 5.5 mm²/s. In some embodiments, the biodiesel has a viscosity at 40° C. of 4.5 mm²/s.

In some embodiments, the biodiesel has a flash point ranging from 120 to 150° C. For example, the biodiesel may have a flash point of 120° C., 122.5° C., 125° C., 127.5° C., 130° C., 132.5° C., 135° C., 137.5° C., 140° C., 142.5° C., 145° C., 147.5° C., or 150° C. In some embodiments, the biodiesel has a flash point of 136° C.

In some embodiments, biodiesel includes a fatty acid methyl ester. In some embodiments, the biodiesel includes a fatty acid methyl ester. In some embodiments, the biodiesel includes a fatty acid methyl ester and a fatty acid ethyl ester. Examples of fatty acid methyl esters and fatty acid ethyl esters include, but are not limited to, butyric acid methyl ester, caprylic acid methyl ester, capric acid ethyl ester, lauric acid methyl ester, myristic acid ethyl ester, palmitic acid methyl ester, stearic acid ethyl ester, arachidic acid methyl ester, behenic acid ethyl ester, lignoceric acid methyl ester, ricinoleic acid ethyl ester, linoleic acid methyl ester, linolenic acid ethyl ester, palmitoleic acid methyl ester, caproic acid ethyl ester, nonanoic acid methyl ester, decanoic acid ethyl ester, undecanoic acid methyl ester, tridecanoic acid ethyl ester, pentadecanoic acid methyl ester, heptadecanoic acid ethyl ester, eicosanoic acid methyl ester, docosanoic acid ethyl ester, tetracosanoic acid methyl ester, pentacosanoic acid ethyl ester, hexacosanoic acid methyl ester, heptacosanoic acid ethyl ester, octacosanoic acid methyl ester, nonacosanoic acid ethyl ester, triacontanoic acid methyl ester, and hentriacontanoic acid ethyl ester. In some embodiments, the biodiesel includes dodecanoic acid methyl ester. In some embodiments, the biodiesel includes oleic acid methyl ester. In some embodiments, the biodiesel includes dodecanoic acid ethyl ester. In some embodiments, the biodiesel includes tetradecanoic acid methyl ester. In some embodiments, the biodiesel includes oleic acid ethyl ester. In some embodiments, the biodiesel includes n-hexadecanoic acid methyl ester. In some embodiments, the biodiesel includes at least one selected from the group consisting of dodecanoic acid methyl ester, oleic acid methyl ester, dodecanoic acid ethyl ester, tetradecanoic acid methyl ester, oleic acid ethyl ester, and n-hexadecanoic acid methyl ester. In some embodiments, the biodiesel includes all of dodecanoic acid methyl ester, oleic acid methyl ester, dodecanoic acid ethyl ester, tetradecanoic acid methyl ester, oleic acid ethyl ester, and n-hexadecanoic acid methyl ester.

In some embodiments, the dodecanoic acid methyl ester is present in an amount ranging from 12.5 to 22.5 wt. %, based on a total weight of biodiesel. For example, the dodecanoic acid methyl ester may be present in an amount of 12.75 wt. %, 13.0 wt. %, 13.25 wt. %, 13.5 wt. %, 13.75 wt. %, 14.0 wt. %, 14.25 wt. %, 14.5 wt. %, 14.75 wt. %, 15.0 wt. %, 15.25 wt. %, 15.5 wt. %, 15.75 wt. %, 16.0 wt. %, 16.25 wt. %, 16.5 wt. %, 16.75 wt. %, 17.0 wt. %, 17.25 wt. %, 17.5 wt. %, 17.75 wt. %, 18.0 wt. %, 18.25 wt. %, 18.5 wt. %, 18.75 wt. %, 19.0 wt. %, 19.25 wt. %, 19.5 wt. %, 19.75 wt. %, 20.0 wt. %, 20.25 wt. %, 20.5 wt. %, 20.75 wt. %, 21.0 wt. %, 21.25 wt. %, 21.5 wt. %, 21.75 wt. %, 22.0 wt. %, 22.25 wt. %, or 22.5 wt. %, based on the total weight of biodiesel. In some embodiments, the dodecanoic acid methyl ester is present in an amount of 19.84 wt. % based on the total weight of biodiesel.

In some embodiments, the dodecanoic acid ethyl ester is present in an amount ranging from 12.5 to 22.5 wt. %, based on a total weight of biodiesel. For example, the dodecanoic acid ethyl ester may be present in an amount of 12.75 wt. %, 13.0 wt. %, 13.25 wt. %, 13.5 wt. %, 13.75 wt. %, 14.0 wt. %, 14.25 wt. %, 14.5 wt. %, 14.75 wt. %, 15.0 wt. %, 15.25 wt. %, 15.5 wt. %, 15.75 wt. %, 16.0 wt. %, 16.25 wt. %, 16.5 wt. %, 16.75 wt. %, 17.0 wt. %, 17.25 wt. %, 17.5 wt.

%, 17.75 wt. %, 18.0 wt. %, 18.25 wt. %, 18.5 wt. %, 18.75 wt. %, 19.0 wt. %, 19.25 wt. %, 19.5 wt. %, 19.75 wt. %, 20.0 wt. %, 20.25 wt. %, 20.5 wt. %, 20.75 wt. %, 21.0 wt. %, 21.25 wt. %, 21.5 wt. %, 21.75 wt. %, 22.0 wt. %, 22.25 wt. %, or 22.5 wt. %, based on the total weight of biodiesel. In some embodiments, the dodecanoic acid ethyl ester is present in an amount of 19.84 wt. % based on the total weight of biodiesel.

In some embodiments, the oleic acid methyl ester is present in an amount ranging 20 to 30 wt. %, based on a total weight of biodiesel. For example, the oleic acid methyl ester may be present in an amount of 20 wt. %, 20.25 wt. %, 20.5 wt. %, 20.75 wt. %, 21.0 wt. %, 21.25 wt. %, 21.5 wt. %, 21.75 wt. %, 22.0 wt. %, 22.25 wt. %, 22.5 wt. %, 22.75 wt. %, 23.0 wt. %, 23.25 wt. %, 23.5 wt. %, 23.75 wt. %, 24.0 wt. %, 24.25 wt. %, 24.5 wt. %, 24.75 wt. %, 25.0 wt. %, 25.25 wt. %, 25.5 wt. %, 25.75 wt. %, 26.0 wt. %, 26.25 wt. %, 26.5 wt. %, 26.75 wt. %, 27.0 wt. %, 27.25 wt. %, 27.5 wt. %, 27.75 wt. %, 28.0 wt. %, 28.25 wt. %, 28.5 wt. %, 28.75 wt. %, 29.0 wt. %, 29.25 wt. %, 29.5 wt. %, 29.75 wt. %, or 30 wt. %, based on the total weight of biodiesel. In some embodiments, the oleic acid methyl ester is present in an amount of 26.18 wt. % based on the total weight of biodiesel.

In some embodiments, the oleic acid ethyl ester is present in an amount ranging 20 to 30 wt. %, based on a total weight of biodiesel. For example, the oleic acid ethyl ester may be present in an amount of 20 wt. %, 20.25 wt. %, 20.5 wt. %, 20.75 wt. %, 21.0 wt. %, 21.25 wt. %, 21.5 wt. %, 21.75 wt. %, 22.0 wt. %, 22.25 wt. %, 22.5 wt. %, 22.75 wt. %, 23.0 wt. %, 23.25 wt. %, 23.5 wt. %, 23.75 wt. %, 24.0 wt. %, 24.25 wt. %, 24.5 wt. %, 24.75 wt. %, 25.0 wt. %, 25.25 wt. %, 25.5 wt. %, 25.75 wt. %, 26.0 wt. %, 26.25 wt. %, 26.5 wt. %, 26.75 wt. %, 27.0 wt. %, 27.25 wt. %, 27.5 wt. %, 27.75 wt. %, 28.0 wt. %, 28.25 wt. %, 28.5 wt. %, 28.75 wt. %, 29.0 wt. %, 29.25 wt. %, 29.5 wt. %, 29.75 wt. %, or 30 wt. %, based on the total weight of biodiesel. In some embodiments, the oleic acid ethyl ester is present in an amount of 26.18 wt. % based on the total weight of biodiesel.

EXAMPLES

The following examples demonstrate a method of vital pulp therapy using bioactive materials as described herein. The examples are provided solely for illustration and are not to be construed as limitations of the present disclosure, as many variations thereof are possible without departing from the spirit and scope of the present disclosure.

Example 1: Materials and Method

The transesterification reaction is consistently influenced by the reaction parameters. In order to maximize biodiesel production, it is advantageous to identify optimal conditions for the transesterification process. Four distinct aspects of transesterification were investigated: the molar ratio of oil to ethanol, which ranged from 1:3 to 1:9; the catalyst concentration, which ranged from 1 to 7 wt. %; the reaction temperature, which ranged from 60 to 85° C., the reaction duration, which ranged from 1 to 4 hours. A manufacturing plant for date oil was situated in Dammam, Saudi Arabia, and it was the source of the date oil supply.

Example 2: Preparation and Characterization of the Catalyst

The desiccated camel dungs were subjected to calcination in a muffle furnace within a temperature range of 600 to 1000° C., with a heating rate of 10° C./min, for a duration of 4 hours. Subsequently, the calcined material was stored in a hermetically sealed glass enclosure. Several analytical techniques, such as X-ray diffraction (XRD), Brunauer-Emmett-Teller (BET) analysis, and scanning electron microscopy/energy-dispersive X-ray spectroscopy (SEM/EDX), were used to investigate the potential of camel dung catalysts for the production of biodiesel.

Example 3: Transesterification Reaction

The transesterification procedure, which converting triglycerides from date seed oil into biodiesel and glycerol, was carried out in a 50 ml round-bottomed flask with the synthesized catalysts. A thermocouple was used to both monitor and regulate the reaction temperature. The admixture was continuously mixed using a magnetic stirrer that was placed in the container. The experiment used specified reaction circumstances, in which a certain quantity of the chosen oil was introduced into the reactor at a stirring velocity of 1000 rpm after it had been pre-heated to a temperature of 60° C. The temperature of the reaction was controlled by immersing the flask in an oil bath. After measuring out and dispersing the catalyst in ethanol, the required quantity of hot date seeds oil was added to the flask. Changes were made to the catalyst loading, ethanol/oil molar ratio, reaction temperature, and reaction duration to maximize biodiesel output by transesterification. Following the completion of the procedure, the solution was subjected to a cooling process and then transferred into a separate funnel. Distinct layers were generated by the catalyst, glycerol, and the ethyl ester. The product was allowed to stand overnight in order to achieve good separation. Following an overnight incubation, distinct stages become readily distinguishable. Subsequently, the biodiesel layer was combined with a volume of 15 ml of distilled water and agitated on a heated surface for a duration of 15 minutes. The resulting mixture was then transferred to a separating funnel and allowed to stand undisturbed for a period of 24 hours, resulting in the formation of two distinct and transparent layers. The underlying stratum was eliminated, and the stratum consisting of biodiesel was combined with 0.05 g of sodium sulfate and agitated for a duration of 10 minutes. Subsequently, the mixture was separated in order to determine the mass of the biodiesel layer.

The yield of biodiesel was calculated using the following equation (1):

$$\text{Yield \%} = \frac{\text{Weight of biodiesel produced}}{\text{Weight of sample oil used}} \times 100 \qquad (1)$$

The final output of biodiesel was subjected to examination and used. The specimens underwent characterization using gas chromatography-mass spectrometry (GC-MS) utilizing a PerkinElmer Clarus 600 instrument, which was outfitted with a DB-wax column. Furthermore, the experimental parameters were enhanced to provide a suitable framework to produce biodiesel from economically viable raw materials in an environmentally beneficial way. The catalysts that have been recovered are then utilized in the succeeding reaction. For the phytochemical screening test, screening of camel dungs was conducted following the standard procedure [Harborne JB., Phytochemical methods, a guide to modern techniques of plant analysis. London, Chapman and Hall, Halsted Press, New York, 1973, 1-32, incorporated herein by reference in its entirety].

Example 4: Basicity Calculation

The basicity of a catalyst is defined as the number of basic sites present on a solid substance relative to its total mass. This quantity is often reported in millimoles (mmol) of basic sites per gram of solid. Titration was used to evaluate the starting materials and the resulting catalyst for their basicity. Approximately 0.2 g of the material was introduced into a 50 mL solution of hydrochloric acid (HCl) with a normality of 0.2 N. The mixture was thereafter agitated until complete dissolution occurred. Subsequently, the solution underwent treatment with a total of three drops of phenolphthalein indicator. Ultimately, the solution underwent titration with a 0.2 N potassium hydroxide (KOH) solution until a discernible change in color occurred. The degree of basicity was thereafter ascertained by using Equation (2) as follows:

$$B_c = \frac{0.2 \times (V_{HCl} - V_{KOH})}{M_s} \qquad \text{Eq. (2)}$$

The variable $V_{HCl}$ represents the quantity of hydrochloric acid (0.2 N) used throughout the titration process, whereas $V_{KOH}$ denotes the quantity of potassium hydroxide (0.2 N) necessary to neutralize the hydrochloric acid. Additionally, Ms signifies the mass of the sample being analyzed, measured in grams. The term "Bc" refers to the basicity of a substance, which is measured in millimoles of hydrochloric acid per gram of sample.

Example 5: XRD Analysis

The calcined samples were subjected to X-ray Diffraction analysis (XRD) using a Brucker AXS-D8 Advance diffractometer manufactured in Germany. The diffractometer used in this study is equipped with a copper anode, which generates Ni-filtered CuKα radiation (k=1.5406). The radiation is produced by a generator operating at 40 kV and 40 mA. The diffraction measurements were conducted between the 2θ range of 20 to 80. The instrument's functionality is maintained by the use of interfaces such as DIFFRACplus SEARCH and DIFFRACplus EVA, which provide an automated process of searching and matching crystalline phases for identification purposes. In the BET analysis, catalyst samples weighing 1 g were subjected to a degassing process lasting 50 minutes at a temperature of 120° C. inside a sample tube. This procedure was carried out to remove any moisture and other surface impurities present on the catalyst samples. The tube was let to reach the surrounding temperature prior to its connection with a gas intake, namely liquid nitrogen at a temperature of −196° C. This gas intake was positioned parallel to an empty reference tube. Both tubes were submerged in liquid nitrogen inside a Dewar flask.

Example 6: Physicochemical Analysis

The principal physicochemical parameters of the selected date seed oil were determined utilizing established methodologies (Table 1).

TABLE 1

| Physico-chemical properties of date seed oil. | | |
| --- | --- | --- |
| Property | Unit | Measured value |
| Kinematic viscosity at 40° C. | Cst | 40 |
| Acid value | mg KOH/g oil | 1.45 |
| Flash point | ° C. | 245 |

Phytochemical analysis of camel dungs revealed: Crude powdered and methanolic extract of camel dungs were rich in alkaloids (+2,+3) flavonoids (2+, +3), terpenoids and steroids (0, +3).

Saponins were absent. Also, the phytochemical analysis showed low amount of sugar, amino acid and protein (1+) respectively. Furthermore, the following minerals were present when the sample was subjected to a heat treatment at 1000° C.—high amount of Ca (25.71) and O (42.05), moderate amount of P (11.92), and low amounts of Si (10.03). Also, when the sample was subjected to heat treatment at 100° C. high amount of Ca (23.7) and oxygen (42.78), moderate amount of Si (16.37), and low amounts of Mg (7.55) and P (6.82) were observed. Very low amounts of K and Na were observed in both the samples Furthermore, low amounts of *Bacillus subtilis* spores were detected in fecal samples. Also, detected pH of camel dungs is 8.6.

TABLE 2

| Preliminary phytochemical screening of 80% methanol extract of camel feces. | | | |
| --- | --- | --- | --- |
| | Test | 80% ethanol | Crude powdered |
| Flavonoids | Mg/H$_2$SO$_4$ | ++ | ++ |
| Alkaloids | Dragendorffs | +++ | ++ |
| Saponins | Foam | – | – |
| Tannins | Ferric chloride | – | – |
| Terpenes & sterol | Salkowski | +++/+++ | Not detect |
| Sugar | Fehling's | + | + |
| Amino acids | Ninhydriene | + | + |
| Proteins | Buiret | ++ | + |
| pH | PH meter | 8.5 | – |

+++ = High amount;
++ = Moderate amount;
+ = Low amount;
± = Trace amount;
– = Not detectable Catalyst samples calcined at several temperatures are shown in Table 3 according to their specific surface area, specific pore volume, and average pore diameter. Catalysts calcined at higher temperatures had a better crystalline order and higher surface area, as shown by XRD (FIG. 4). In addition, the pore size of catalyst calcined at 800° C. was found to be less than that of other catalysts. Microporous materials have the pore sizes as shown below in Table 3.

TABLE 3

| BET analysis | | | |
| --- | --- | --- | --- |
| Camel dung catalyst at different calcination temperature | Surface area (m$^2$/g) | Pore Size (nm) | Pore Volume (cm$^3$/g) |
| 100 | 28.0316 | 2.0842 | 0.029211 |
| 400 | 29.341 | 2.0082 | 0.026210 |
| 600 | 56.311 | 1.9812 | 0.089271 |
| 800 | 177.698 | 1.8977 | 0.16861 |

Figure 1A:
FIG. 1A is a pictorial image of camel dung before heat treatment, according to certain embodiments.
Figure 1B:
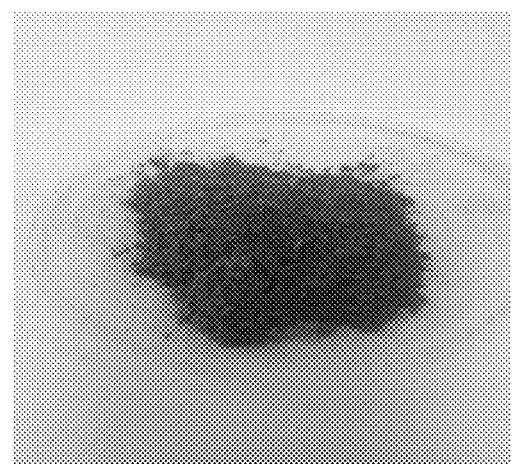
FIG. 1B is a pictorial image of camel dung after wash and dry, according to certain embodiments.
Figure 1C:
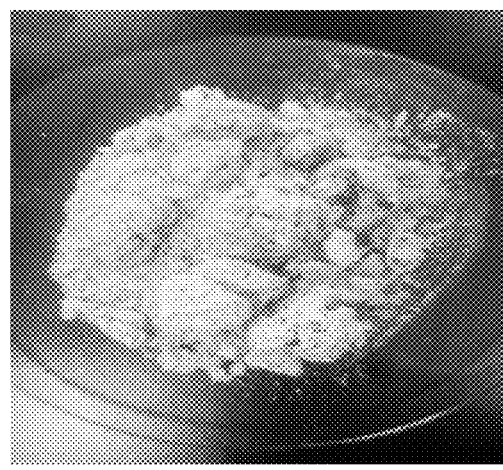
FIG. 1C is a pictorial image of camel dung after calcination, according to certain embodiments.
Figure 2A:
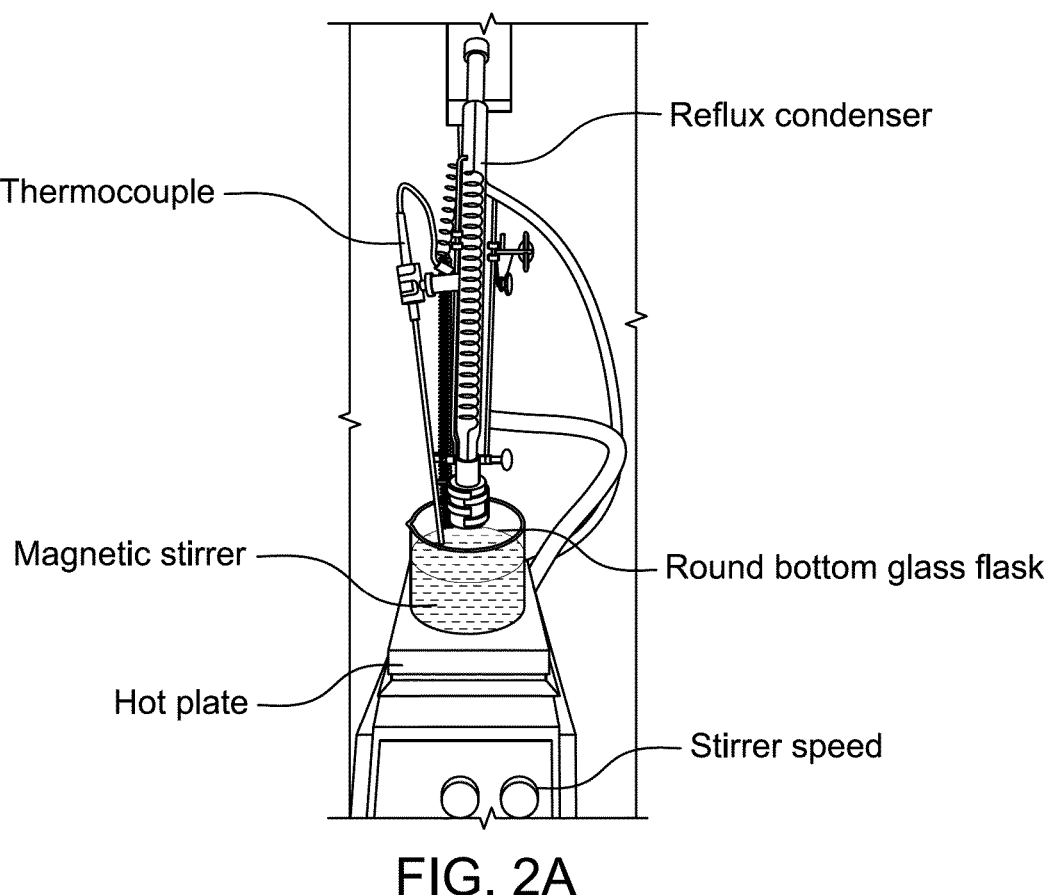
FIG. 2A is a pictorial presentation of glass reactor for synthesis of biodiesel, according to certain embodiments.
Figure 2B:
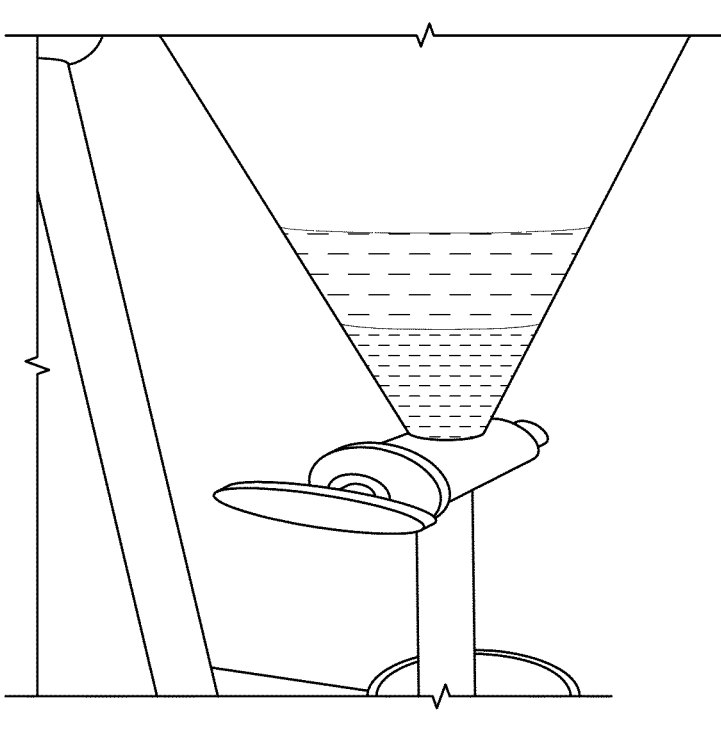
FIG. 2B is a pictorial presentation for biodiesel separation, according to certain embodiments.
Figure 3:
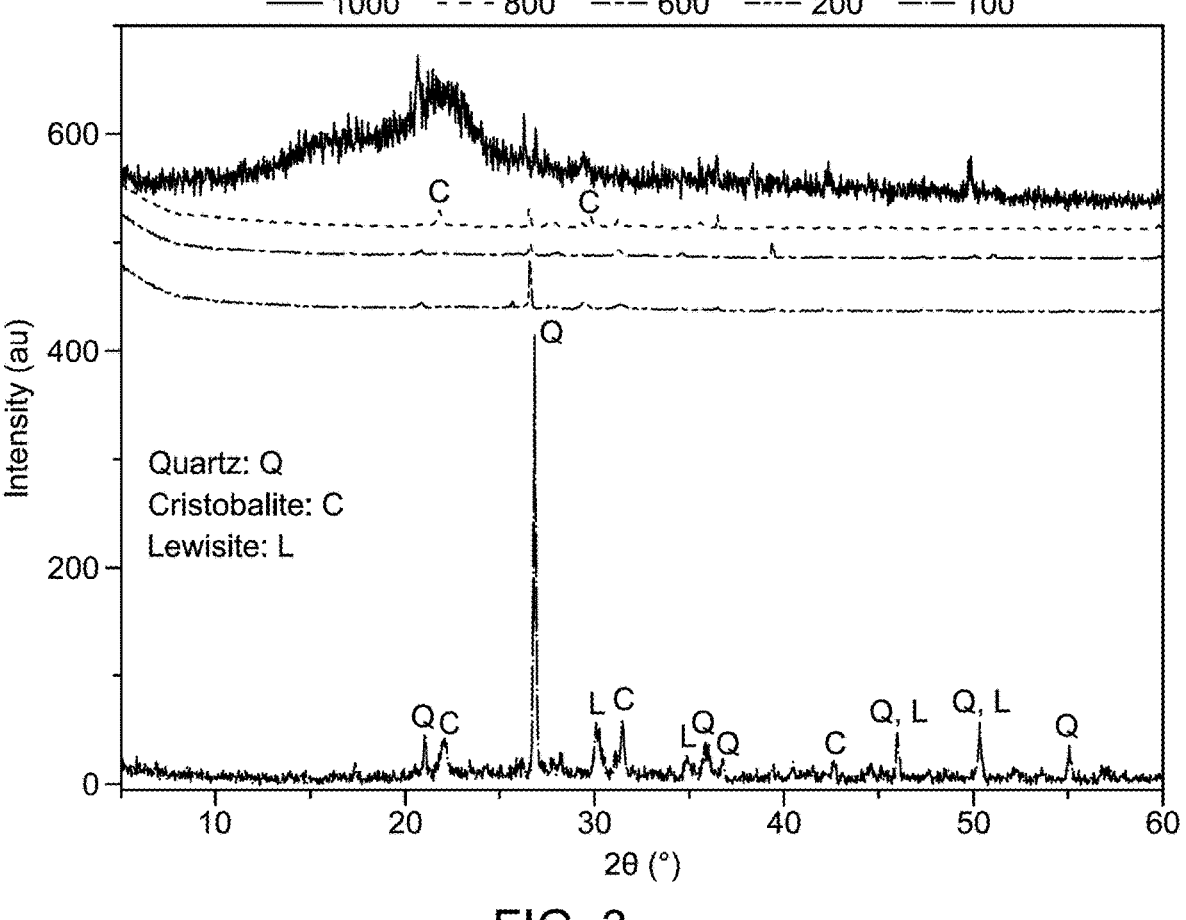
FIG. 3 shows powder X-ray diffraction (PXRD) analysis of camel dung samples treated at different temperatures, according to certain embodiments.

FIG. 3 shows the X-Ray Powder Diffraction analysis of camel dung samples treated at different temperatures. Three crystalline minerals are detected, two of which are forms of silica, Quartz and Cristobalite, the third mineral is Lewisite. The presence of these minerals was confirmed by EDX elemental analysis. Noticing the intensity of the two cristobalite phase peaks at 20 of 22.05° and 31.47°, the content of the moor amorphous cristobalite phase increases relative to the more crystalline quartz phase. It is clear from the FIG. 3 that the degree of crystallinity decreases with increasing sintering temperature, ended with amorphization at 1000° C. The decrease in crystallinity with rising temperature is corroborative with both of surface area, pore size, analysis and catalytic activity of the obtained catalysts. Table 3 shows the increase in surface area with increasing amorphization also pore size decreases with increasing sintering temperature, due to migration of silica particles which leads to closer packing of particles.

A Scanning Electron Microscope (SEM) micrograph of camel dung sample treated at 800° C. is presented in FIG. 4A. The partial hexagonal crystals of quartz mineral and octahedral crystal of cristobalite mineral are indicated by arrows. The presence of quartz and cristobalite minerals was confirmed by XRD analysis shown in FIG. 3. Energy Dispersive X-ray (EDX) analysis FIG. 4B confirms this also. The image shwoes particles of platy, croded rod, rectangular, and prismatic shapes of different sizes. From the image, the average surface area of the particles was estimated to be about 1.2×0.6 μm. The average of content of different chemical elements obtained by EDX are presented in Table 4. This confirms the presence of Lewisite mineral element's which appear in XRD (FIG. 3). The high atomic % of oxygen in Table 4 indicate the presence of all metals as oxides and oxysalts.

TABLE 4

| The content of different elements of the camel dung sample treated at 800° C. | | | | |
| --- | --- | --- | --- | --- |
| Element | Weight % | Atomic % | Net Int. | Error % |
| NaK | 2.21 | 2.15 | 1.81 | 70.82 |
| MgK | 7.55 | 6.92 | 11.25 | 15.7 |
| SiK | 16.37 | 12.98 | 33.82 | 8.93 |
| PK | 6.82 | 4.91 | 10.74 | 17.04 |
| KK | 0.56 | 0.32 | 0.92 | 70.05 |
| CaK | 23.7 | 13.17 | 31.6 | 8.58 |
| Oxygen | 42.05 | 59.28 | 0 | 0 |

It is important to acknowledge that calcination may be advantageous for the removal of secondary crystalline phases, hence facilitating the advancement of the desired phase. The impact of activation temperature on transesterification activity was investigated within the temperature range of 600-1000° C. for the chosen feedstock, as demonstrated in Table 5. The use of calcination on the catalyst facilitates the removal of secondary phases, leading to enhanced crystallinity and particle compaction. The findings of the study indicated a direct relationship between the increase in calcination temperature of waste camel dung-derived material and the corresponding rise in biodiesel conversion. The catalyst that underwent calcination at 800° C. exhibited the most significant catalytic activity when compared to other catalysts. The catalysts subjected to calcination at a temperature of 800° C. (referred to as C800) exhibited significant catalytic activity, perhaps attributed to the presence of an ideal quantity of active basic sites on the catalyst's surface. The surface area magnitude of a catalyst plays a crucial role in influencing the accessibility of reactants to the active sites. Consequently, it directly impacts the catalyst's activity and efficacy in the transesterification process. As a result, the C800 catalyst was chosen to for further catalytic analysis in the production of biodiesel. Moreover, according to the basicity values shown in Table 6, it can be seen that the catalyst calcined at a higher temperature exhibits a greater level of basicity in comparison to the catalysts calcined at lower temperatures. The greatest basicity value observed was 8.3 mmol/HCl when the catalyst was calcined at a temperature of 800° C. Subsequently, a decrease in basicity was observed, with the value dropping from 8.3 to 7.8 mmol/HCl, when the temperature of catalyst calcination above 800° C. This reduction in basicity may be attributed to the accelerated sintering rate of the catalyst at higher calcination temperatures, ultimately resulting in the suppression of its basicity. Based on the findings derived from the above characterization outcomes, it has been determined that the catalyst exhibits a significantly enhanced level of efficiency when the calcination temperature is elevated to 800° C. Consequently, the aforementioned catalyst was chosen for further investigation.

TABLE 5

The impact of varying calcination temperatures on the catalytic activity of camel dung

| Temperature of calcination (° C.) | Biodiesel yield (%) |
|---|---|
| Uncalcined | — |
| 600 | 65 |
| 800 | 86 |
| 1000 | 80 |

Reaction conditions: catalyst loading 4 wt. %, reaction time 3 h, reaction temperature 75° C., oil to ethanol molar ratio 1:8.

TABLE 6

The influence of calcination temperature on the basicity of the catalysts.

| Calcination temperature (° C.) | Basicity (mmol/HCl) |
|---|---|
| 600 | 7 |
| 800 | 8.3 |
| 1000 | 7.8 |

Example 7: Catalytic Evaluation

Reaction conditions: catalyst loading 4 wt. %, reaction time 3 h, reaction temperature 75° C., oil to ethanol molar ratio 1:8.

The date seeds oil-to-ethanol molar ratio was considered to be a very significant parameter in the process of transesterification. Insufficient or excessive quantities of ethanol in a chemical process result in a diminished output of biodiesel. The impact of the ethanol to oil molar ratio on the production of biodiesel is presented in FIG. 5. The molar ratios of ethanol to date seeds oil used in the transesterification process ranged from 2:1 to 10:1. The data shown in FIG. 5 clearly indicates that a molar ratio of 1:1 leads to a suboptimal biodiesel production and incomplete reaction, characterized by an excess of feedstock, perhaps due to an insufficient amount of ethanol in the reaction mixture. An upward correlation between the ratio of reactants and the yield was seen until a ratio of 8:1 was attained. At this point, the excess ethanol present in the mixture caused a modification in the kinetics of the reaction, leading to an enhanced interaction between the reactants and a higher conversion rate to biodiesel. Nevertheless, when the molar ethanol to oil ratio exceeded 8:1, there was a decrease in biodiesel production due to complications in the subsequent stages of the process. This hindered the separation of the desired product from the by-products, posing obstacles. The transesterification process has a tendency to undergo reverse reaction, leading to the formation of reactants rather of the desired biodiesel product. The reversible nature of the transesterification process has been identified as the cause of this outcome. Consequently, the preferred ratio of reactants was determined to be 8:1.

It is apparent that the quantity of biodiesel generated during a transesterification process is impacted by temperature. As shown in FIG. 6, the progressive transformation of date seed oil into biodiesel took place at reaction temperatures ranging from 50 to 80° C. At a reaction temperature of around 75° C., biodiesel production was approximately 86% of its maximum. An increase in temperature facilitates the ascent of the substrate beyond the barrier of activation energy. Due to the reduction in viscosity of date seeds oil, the yield of biodiesel typically increases with the temperature of the reaction. Lower yields of biodiesel were obtained at reaction temperatures below or above 75° C. This is attributed to of the oil's high viscosity at lower temperatures, resulting in insufficient mixing among the reactants at lower temperatures. Nevertheless, according to Kirubakaran, increasing the reaction temperature above the optimal level does not result in an improvement in the biodiesel yield [Kirubakaran, M, and V. Arul Mozhi Selvan, Renewable and Sustainable Energy Reviews, 82, July 2017, 390-401, incorporated herein by reference in its entirety]. According to Ngige, an increase in reaction temperature leads to a heightened rate of saponification in triglycerides, resulting in a decrease in the generation of biodiesel [Ngige, Godswill Adizue, et. al., Digital Chemical Engineering 6, October 2022, 100066, incorporated herein by reference in its entirety]. Furthermore, Baskar observed a reduction in the polarity of methanol resulting from the excessive heating of reactants in a transesterification process [Baskar, G. et al., Bioresource Technology, 2017, 250, 793-98, incorporated herein by reference in its entirety]. This loss in polarity is identified as a contributing factor to the limited production of biodiesel at elevated reaction temperatures. Furthermore, ethanol has a low boiling point, it may not have been as available in the reaction mixture. This is because ethanol is constantly condensing, even though the biodiesel output was lower at 80° C.

Typically, the production of biodiesel exhibits an augmented yield in correlation with the duration of the reaction. The optimal response time for a transesterification process is contingent upon several factors, including the specific feedstock, the catalyst used, and its concentration. FIG. 7 demonstrates the influence of response time on the transesterification process. The highest achievable biodiesel production was obtained after a reaction period of three hours. According to a previous study by Baskar referenced above, the biodiesel yield undergoes a significant reduction due to the reversible reaction of the transesterification process, after the ideal reaction time. Additionally, longer reaction time may result in the hydrolysis of esters and the formation of additional fatty acids, thereby reducing the yield of biodiesel.

The concentration of catalyst has a significant impact on the production of biodiesel. Therefore, a predetermined loading spectrum was used to evaluate its effect. The production of biodiesel at a catalyst loading of 1 wt. % resulted in a comparatively lower yield (FIG. 8). This may be attributed to a decrease in the number of active sites available, leading to an incomplete conversion of the reactants. The increase in catalyst concentration resulted in an improvement in the yield of biodiesel. This trend was seen consistently throughout the whole range of concentrations and was attributable to the greater availability of active sites during the reaction. Nevertheless, there was a noticeable decline in the production of biodiesel, ranging from 4 to 7.5 wt. %. One possible explanation for this phenomenon is that higher catalyst quantities, exceeding the average value, can result in increased stickiness of the transesterification reaction product. This stickiness tends to hinder the mass transfer process within the liquid (oil/alcohol/solid (catalyst)) structure, ultimately causing a decline in biodiesel yield once the optimal catalyst quantity has been surpassed. Moreover, the reduction in biodiesel production might also be attributed to an excessive presence of heterogeneous catalysts inside the reaction container. This surplus of catalysts may hinder the effective blending of reactants, thus resulting in a decline in the overall yield of biodiesel. The presence of larger catalyst loadings might also lead to mass transfer limits of reactants and products, which in turn may contribute to suboptimal biodiesel synthesis as well as the increase in viscosity of the mixture of reactants hinders the process of mixing and mass transfer, resulting in a reduction in the yield of biodiesel. Therefore, it was deduced that a catalyst loading of 4 wt. % yielded the highest productivity for this particular reaction.

The fuel characteristics of the biodiesel produced were assessed using the American Society for Testing and Materials' (ASTM) methodology, which is often used to determine its quality and adherence to established biodiesel criteria. The data shown in Table 7 demonstrates that the biodiesel generated exhibited fuel properties of superior quality, falling within the specified range outlined by the biodiesel standard.

TABLE 7

Biodiesel's fuel qualities at ideal reaction circumstances.

| Property | Unit | ASTM | Measured value for prepared biodiesel |
|---|---|---|---|
| Density | kg/m$^3$ | 860-894 | 887 |
| Viscosity @40° C. | mm$^2$/s | 1.8-5.0 | 4.5 |
| Acid number | mg KOH/g | ≤0.45 | 0.5 |
| Flash point | ° C. | >120 | 136 |

The identification of fatty acid ethyl esters (FAMEs) in biodiesel was accomplished using gas chromatography-mass spectrometry (GC-MS) analysis. Table 8 provides a comprehensive description of the fatty acid ethyl esters and other associated products, offering a more detailed analysis and elucidation of their characteristics and properties. The study successfully identified all the anticipated fatty acid ethyl esters, which are known to be significant constituents of biodiesel.

TABLE 8

The identification of fatty acid ethyl esters (FAMEs) in biodiesel was accomplished using (GC/MS).

| Peak | RT | Name | Formula | Area | Area Sum % |
|---|---|---|---|---|---|
| 1 | 5.153 | 1-Deoxy-d-mannitol | $C_6H_{14}O_5$ | 352087.25 | 0.87 |
| 2 | 5.399 | 2,4-Nonadienal, (E,E)- | $C_9H_{14}O$ | 274831.72 | 0.68 |
| 3 | 7.676 | Octadecane | $C_{18}H_{38}$ | 413310.22 | 1.02 |
| 4 | 7.779 | 2-Undecanone | $C_{11}H_{22}O$ | 192092.96 | 0.47 |
| 5 | 7.814 | 2,4-Dodecadienal, (E,E)- | $C_{12}H_{20}O$ | 557769.5 | 1.38 |
| 6 | 7.98 | 2,4-Decadienal, (E,E)- | $C_{10}H_{16}O$ | 1002522.2 | 2.47 |
| 7 | 8.924 | Heptacosane | $C_{27}H_{56}$ | 121366.81 | 0.3 |
| 8 | 9.181 | Hexadecane, 2,6,10,14-tetramethyl- | $C_{20}H_{42}$ | 649182.3 | 1.6 |
| 9 | 9.33 | Phenol, 2,4-bis(1,1-dimethylethyl)- | $C_{14}H_{22}O$ | 176278.49 | 0.43 |
| 10 | 9.513 | Heptadecane, 2,6,10,15-tetramethyl- | $C_{21}H_{44}$ | 243331.52 | 0.6 |
| 11 | 9.645 | Dodecanoic acid | $C_{12}H_{24}O_2$ | 8048132.3 | 19.84 |
| 12 | 9.919 | Dodecanoic acid, ethyl ester | $C_{14}H_{28}O_2$ | 3078485.4 | 7.59 |
| 13 | 10.829 | Dodecanoic acid, propyl ester | $C_{15}H_{30}O_2$ | 181963.67 | 0.45 |
| 14 | 11.104 | Eicosane, 10-methyl- | $C_{21}H_{44}$ | 495021 | 1.22 |
| 15 | 11.619 | Tetradecanoic acid | $C_{14}H_{28}O_2$ | 3417453.9 | 8.43 |
| 16 | 12.099 | Tetradecanoic acid, ethyl ester | $C_{16}H_{32}O_2$ | 1279835.7 | 3.16 |
| 17 | 13.49 | Didodecyl phthalate | $C_{32}H_{54}O_4$ | 115186.31 | 0.28 |
| 18 | 13.684 | Di-n-decylsulfone | $C_{20}H_{42}O_2S$ | 109503.95 | 0.27 |
| 19 | 14.4 | Eicosane | $C_{20}H_{42}$ | 463845.71 | 1.14 |
| 20 | 14.995 | n-Hexadecanoic acid | $C_{16}H_{32}O_2$ | 2389652.8 | 5.89 |
| 21 | 15.189 | Tetradecane, 2,6,10-trimethyl- | $C_{17}H_{36}$ | 175242.7 | 0.43 |
| 22 | 15.67 | Hexadecanoic acid, ethyl ester | $C_{18}H_{36}O_2$ | 874532.69 | 2.16 |
| 23 | 18.508 | Oleic Acid | $C_{18}H_{34}O_2$ | 10618341 | 26.18 |
| 24 | 18.886 | Octadecanoic acid | $C_{18}H_{36}O_2$ | 385398.68 | 0.95 |
| 25 | 18.96 | 9,12-Octadecadienoyl chloride, (Z,Z)- | $C_{18}H_{31}ClO$ | 331658.8 | 0.82 |
| 26 | 19.063 | Ethyl Oleate | $C_{20}H_{38}O_2$ | 2646888.7 | 6.53 |
| 27 | 20.808 | Butyl 9-tetradecenoate | $C_{18}H_{34}O_2$ | 195625.04 | 0.48 |
| 28 | 25.174 | Phenol, 2,2'-methylenebis[6-(1,1-dimethylethyl)-4-methyl- | $C_{23}H_{32}O_2$ | 1768548.2 | 4.36 |

Numerous modifications and variations of the present disclosure are possible in light of the above teachings. Therefore, it is to be understood that within the scope of the appended claims, the invention may be practiced other than as specifically described herein.

The invention claimed is:

1. A transesterification catalyst, comprising
quartz particles;
cristobalite particles; and
particles of a silicon-substituted hydroxycalcioromerite, wherein
the quartz particles, cristobalite particles, and silicon-substituted hydroxycalcioromerite particles are crystalline by PXRD.

2. The transesterification catalyst of claim 1, wherein the catalyst comprises
sodium present in an amount of 1.5 to 4.0 wt. %;
magnesium present in an amount of 5.0 to 10.0 wt. %;
silicon present in an amount of 12.5 to 20 wt. %;
phosphorous present in an amount of 2.5 to 10 wt. %;
calcium present in an amount of 17.5 to 27.5 wt. %; and
oxygen present in an amount of 37.5 to 50.0 wt. %, each based on a total weight of catalyst.

3. The transesterification catalyst of claim 1, wherein the catalyst has
a basicity of 6.5 to 9.0 mmol HCl/g.

4. The transesterification catalyst of claim 1, wherein the catalyst has
a BET surface area of 50 to 250 m²/g;
a mean pore size of 1.50 to 2.50 nm; and
a pore volume of 0.075 to 0.250 cm³/g.

5. The transesterification catalyst of claim 1, wherein
the quartz particles, cristobalite particles, and silicon-substituted hydroxycalcioromerite particles each have a mean particle size of 0.1 to 3.0 μm.

6. A method of forming the catalyst of claim 1, the method comprising calcining dried camel dung at 600 to 1000° C. for 1 to 8 hours.

7. The method of claim 6, wherein
the camel dung is dung of *Camelus dromedarius.*

8. The method of claim 6, wherein
the calcining is performed with a heating rate of 5 to 20° C./min.

9. A method of forming biodiesel, the method comprising
reacting an alcohol having 1 to 5 carbon atoms with a plant-derived oil in the presence of the catalyst of claim 1 to form a biodiesel comprising a fatty acid ester; and
collecting the biodiesel by separation.

10. The method of claim 9, wherein
the catalyst is present in an amount of 0.25 to 10 wt. % based on a total weight of alcohol and plant-derived oil.

11. The method of claim 9, wherein
the alcohol and plant-derived oil are present in a mole ratio of 1:1 to 1:15.

12. The method of claim 9, wherein
the reacting is performed at 50 to 100° C.

13. The method of claim 9, wherein
the plant-derived oil is date seed oil.

14. The method of claim 9, wherein
the alcohol having 1 to 5 carbon atoms is ethanol.

15. The method of claim 9, wherein
the method has a biodiesel yield of 70 to 95%.

16. The method of claim 9, wherein the biodiesel has
an acid number of 0.25 to 0.75 mg KOH/g,
a density of 865 to 910 kg/m³,
a viscosity at 40° C. of 3.5 to 5.5 mm²/s, and
a flash point of 120 to 150° C.

17. The method of claim 9, wherein
the reacting is performed for 0.5 to 6 hours.

18. The method of claim 9, wherein the biodiesel comprises
dodecanoic acid methyl ester; and
oleic acid methyl ester.

19. The method of claim 18, wherein
the dodecanoic acid methyl ester is present in an amount of 12.5 to 22.5 wt. %; and
the oleic acid methyl ester is present in an amount of 20 to 30 wt. %, each based on a total weight of biodiesel.

20. The method of claim 18, wherein the biodiesel further comprises
dodecanoic acid ethyl ester;
tetradecanoic acid methyl ester;
oleic acid ethyl ester; and
n-hexadecanoic acid methyl ester.

* * * * *